United States Patent
Saishu et al.

(10) Patent No.: US 8,441,526 B2
(45) Date of Patent: May 14, 2013

(54) STRUCTURE OF STEREOSCOPIC IMAGE DATA, STEREOSCOPIC IMAGE DATA RECORDING METHOD, REPRODUCING METHOD, RECORDING PROGRAM, AND REPRODUCING PROGRAM

(75) Inventors: Tatsuo Saishu, Tokyo (JP); Rieko Fukushima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 816 days.

(21) Appl. No.: 10/581,364

(22) PCT Filed: Mar. 28, 2006

(86) PCT No.: PCT/JP2006/307003
§ 371 (c)(1),
(2), (4) Date: Dec. 5, 2008

(87) PCT Pub. No.: WO2007/026444
PCT Pub. Date: Mar. 8, 2007

(65) Prior Publication Data
US 2009/0102916 A1 Apr. 23, 2009

(30) Foreign Application Priority Data
Aug. 31, 2005 (JP) ................................ 2005-251412

(51) Int. Cl.
*H04N 13/04* (2006.01)

(52) U.S. Cl.
USPC ......................................................... 348/54

(58) Field of Classification Search ..................... 348/54
See application file for complete search history.

(56) References Cited

U.S. PATENT DOCUMENTS

| 6,055,012 A | 4/2000 | Haskell et al. |
| 6,064,424 A * | 5/2000 | van Berkel et al. ............. 348/51 |
| 7,281,802 B2 | 10/2007 | Saishu et al. |
| 7,425,951 B2 | 9/2008 | Fukushima et al. |
| 2001/0038413 A1 | 11/2001 | Peleg et al. |
| 2004/0252374 A1 | 12/2004 | Saishu et al. |
| 2005/0105179 A1 | 5/2005 | Taira et al. |

(Continued)

FOREIGN PATENT DOCUMENTS

| JP | 2001-501073 | 1/2001 |
| JP | 2005-258421 | 9/2005 |

(Continued)

OTHER PUBLICATIONS

International Preliminary Report on Patentability and Written Opinion issued by the International Bureau of WIPO on Mar. 4, 2008, for International Application No. PCT/JP2006/307003.

(Continued)

*Primary Examiner* — Richard Torrente
(74) *Attorney, Agent, or Firm* — Finnegan, Henderson, Farabow, Garrett & Dunner, L.L.P.

(57) ABSTRACT

It is made possible to record stereoscopic image data of parallel-ray one-dimensional IP type in a format at a high compression rate with little image quality degradation. This stereoscopic image data can be efficiently decompressed and reproduced. A stereoscopic image data structure includes: a parallax component image data representing n or more parallax component images, each having accumulated pixels that cause the pixels to generate the parallel light rays in the same parallax direction in the viewing zone, and having different numbers of horizontal pixels. N combined images with the same numbers of vertical and horizontal pixels are a unit to be converted into a parallax interleaved image, the n combined images being formed by combining two or more parallax component images with parallax directions different from each other by n.

20 Claims, 15 Drawing Sheets

U.S. PATENT DOCUMENTS

| | | | |
|---|---|---|---|
| 2005/0259323 A1 | 11/2005 | Fukushima et al. | |
| 2005/0264651 A1 | 12/2005 | Saishu et al. | |

FOREIGN PATENT DOCUMENTS

| | | |
|---|---|---|
| JP | 2006-98779 | 4/2006 |
| JP | 4202991 | 10/2008 |
| WO | WO-99/05559 | 2/1999 |
| WO | WO 2006/035884 A1 | 4/2006 |

OTHER PUBLICATIONS

Feldman et al.; "The Parallax Player: A Stereoscopic Format Converter"; Proc. of SPIE, vol. 5006, pp. 175-186, (2003).

Berkel; "Image Preparation for 3D-LCD"; Proc. of SPIE, vol. 3639, pp. 84-91, (1999).

Saishu et al.; "53.3: Distortion Control in a One-Dimensional Integral Imaging Autostereoscopic Display System With Parallel Optical Beam Groups"; SID 04 Digest, pp. 1438-1441, (2004).

International Search Report issued by the European Patent Office on Jun. 27, 2006, for International Application No. PCT/JP2006/307003.

Notification of Reasons for Rejection issued by the Japanese Patent Office on Nov. 27, 2009, for Japanese Patent Application No. 2005-251412, and English-language translation thereof.

* cited by examiner

| PARALLAX NUMBER | 3D PIXEL NUMBER | |
|---|---|---|
| | START (LEFT END) | END (RIGHT END) |
| -13 | 2 | 30 |
| -12 | 2 | 76 |
| -11 | 2 | 123 |
| -10 | 2 | 170 |
| -9 | 2 | 217 |
| -8 | 1 | 264 |
| -7 | 1 | 311 |
| -6 | 1 | 358 |
| -5 | 1 | 405 |
| -4 | 1 | 451 |
| -3 | 1 | 480 |
| -2 | 1 | 480 |
| -1 | 1 | 480 |
| 1 | 1 | 480 |
| 2 | 1 | 480 |
| 3 | 1 | 480 |
| 4 | 30 | 480 |
| 5 | 76 | 480 |
| 6 | 123 | 480 |
| 7 | 170 | 480 |
| 8 | 217 | 480 |
| 9 | 264 | 479 |
| 10 | 311 | 479 |
| 11 | 358 | 479 |
| 12 | 405 | 479 |
| 13 | 451 | 479 |

STRUCTURE OF STEREOSCOPIC IMAGE DATA, STEREOSCOPIC IMAGE DATA RECORDING METHOD, REPRODUCING METHOD, RECORDING PROGRAM, AND REPRODUCING PROGRAM

CROSS-REFERENCE TO RELATED APPLICATION

This application is based upon and claims the benefit of priority from prior Japanese Patent Application No. 2005-251412 filed on Aug. 31, 2005 in Japan, the entire contents of which are incorporated herein by reference.

BACKGROUND OF THE INVENTION

1. Field of the Invention

The present invention relates to a stereoscopic image data structure, a stereoscopic image data recording method, a reproducing method, a recording program, and a reproducing program.

2. Related Art

There have been various types of stereoscopic display devices or three-dimensional display devices that can display moving stereoscopic images. In recent years, there has been an increasing demand for stereoscopic display devices of flat panel types that do not require special glasses or the likes. In a flat-panel display device such as a liquid crystal display device or a plasma display device of a direct view type or a projection type, the pixel locations in the display plane are fixed, and a parallax barrier that controls the light rays from the display panel toward the viewer is provided directly in front of the display panel. Thus, a stereoscopic display device can be produced with relative ease.

Through a parallax barrier, light rays are controlled in such a manner that different images can be seen from different angles even when the same location on the parallax barrier is viewed. More specifically, in a case where only right and left parallaxes (horizontal disparities) are given, a slit sheet or a lenticular sheet (a cylindrical lens array) is used. In a case where vertical disparities are also given, a pinhole array or a lens array is used. Structures with parallax barriers are further classified into binocular types, multiview types, super-multiview types (multiview types under super-multiview conditions), and integral photography (IP) types. The principles of those structures are basically the same as the principles of stereoscopic photography invented almost 100 years ago.

Generally, in a structure of the IP type or the multiview type, the viewing distance is limited, and therefore, a display image is created so that a perspectively projected image can be actually viewed at the viewing distance. In the structure of the IP type only with the horizontal disparities (the one-dimensional IP type, see "SID04 Digest 1438" (2004), for example), sets of parallel light rays are formed in a case where the horizontal pitch of the parallax barrier is set at an integral multiple (n) of the horizontal pitch of pixels (this IP type will be hereinafter also referred to as the "parallel-ray one-dimensional IP type"). Accordingly, a parallax component image in which pixel columns forming sets of parallel light rays are integrated is a perspectively projected image with a predetermined viewing distance in the vertical direction while being an orthographically projected image in the horizontal direction. Each parallax component image that is a perspectively projected image in the vertical direction while being an orthographically projected image in the horizontal direction is divided into pixel columns, and the pixel columns are rearranged in an interleaving manner, so as to form a parallax interleaved image (an elemental image array). The parallax interleaved image is displayed on the display plane and is viewed through the parallax barrier. In this manner, a stereoscopic image is obtained through normal projection, which is perspective projection in both the horizontal direction and the vertical direction. This method is described in greater detail in "SID04 Digest 1438" (2004). In a structure of the multiview type, images formed through simple perspective projection are divided into pixel columns and are rearranged in an interleaving manner, so as to form a stereoscopic image with normal projection.

An image-taking device that uses different projecting methods and different projection center distances depending on the direction (the vertical or horizontal direction) is difficult to produce, because a camera or lenses of the same size as each object are required for orthographic projection. Therefore, to obtain orthographic projection data through image taking, a method of converting perspective projection data into orthographic projection data is preferred in practice. As an example of such a method, the "ray space method" that involves interpolation using an "EPI (epipolar plane)" is known.

The parallel-ray one-dimensional IP is more advantageous in viewability than the binocular method. However, in a structure of the parallel-ray one-dimensional IP type, the image format is complicated in terms of projection and division allocation. In a binocular or multiview structure that is one of the simplest stereoscopic display structures, the image format is also simple, and the images from all the viewpoints are formed with the same numbers of vertical and horizontal pixels. Two parallax component images in the case of the binocular type, or nine parallax components images in the case of a nine-lens type, are divided into pixel columns, and the pixel columns are rearranged into a parallax interleaved image to be displayed on the display plane.

Compared with the multiview type with similar resolutions, the number of parallax components images is larger in a structure of the parallel-ray one-dimensional IP type, and the numbers of horizontal pixels (or the horizontal ranges to be used) of the parallax component images vary with the parallax directions. As a result, the image format is complicated. With these facts being taken into consideration, the inventors suggested a method of efficiently recording a stereoscopic image involving a high compression rate with little degradation of image quality (Japanese Patent Application No. 2004-285246).

The cylindrical lenses of a lenticular sheet may extend diagonally, instead of vertically (see JP-A KOKAI No. 2001-501073). The inventors also discovered that the parallel-ray one-dimensional IP type could be applied to a structure of the slanted lens type (Japanese Patent Application No. 2004-32973).

In a case where parallax information is allocated to each sub-pixel in a structure of the multiview type or the parallel-ray one-dimensional IP type, the parallax information is mixed when images in the form of parallax interleaved images are irreversibly compressed by an encoding method such as JPEG or MPEG. As a result, the image quality is degraded at the time of decompression. In a case of reversible (lossless) compression, the problem of image quality degradation is not caused, but the compression rate is much lower than in the case of irreversible (lossy) compression. Also, a method of irreversibly compressing and then decompressing parallax component images independently of one another is easily applied in a structure of a multiview type. However, such a method is not reasonable in a structure of the parallel-ray one-dimensional IP type that involves a large number of parallax component images with different numbers of horizontal pixels. Especially in a case where the lenses extend diagonally with respect to the vertical direction, the data format and processing become more complicated, and it is difficult to achieve a high resolution and a high processing speed at the same time.

As described above, the conventional method of recording a stereoscopic image of a parallel-ray one-dimensional IP type has the problems of image quality degradation with a high compression rate at the time of decompressing.

SUMMARY OF THE INVENTION

The present invention is proposed in consideration of the aforementioned circumstances, and it is an object of the present invention to provide a stereoscopic image data structure, a recording method, a reproducing method, a recording program, and a reproducing program that cause little image quality degradation in an efficient process at a high compression rate in a structure of a parallel-ray one-dimensional IP type using lenses extending diagonally with respect to the vertical direction.

According to a first aspect of the present invention, there is provided a stereoscopic image data structure for a stereoscopic display device that displays a stereoscopic image, with parallaxes being given in a horizontal direction but not given in a vertical direction, the stereoscopic display device comprising:

a display unit that has a display face on which a parallax interleaved image for stereoscopic display is displayed, with pixels being arranged with a first horizontal pitch in the horizontal direction; and a parallax barrier that has linear optical apertures disposed to face the display face and arranged with a second horizontal pitch in the horizontal direction, the optical apertures inclined from the vertical direction, the second horizontal pitch being equal to an integral multiple (n) of the first horizontal pitch, the parallax barrier directing light rays emitted from pixels at horizontal intervals of n pixels as parallel light rays toward the viewing zone, the stereoscopic image data structure comprising: a parallax component image data representing n or more parallax component images, each having accumulated pixels that cause the pixels to generate the parallel light rays in the same parallax direction in the viewing zone, and having different numbers of horizontal pixels, wherein n combined images with the same numbers of vertical and horizontal pixels are a unit to be converted into a parallax interleaved image, the n combined images being formed by combining one or more parallax component images with parallax directions different from each other by n.

According to a second aspect of the present invention, there is provided a method of recording stereoscopic image data for a stereoscopic display device that displays a stereoscopic image, with parallaxes being given in a horizontal direction but not given in a vertical direction, the stereoscopic display device including:

a display unit that has a display face on which a parallax interleaved image for stereoscopic display is displayed, with pixels being arranged with a first horizontal pitch in the horizontal direction; and a parallax barrier that has linear optical apertures disposed to face the display face and arranged with a second horizontal pitch in the horizontal direction, the optical apertures inclined from the vertical direction, the second horizontal pitch being equal to an integer multiple (n) of the first horizontal pitch, the parallax barrier directing light rays emitted from pixels at horizontal intervals of n pixels as parallel light rays toward the viewing zone, the method comprising:

preparing a parallax component image data representing n or more parallax component images, each having accumulated pixels that cause the pixels to generate the parallel light rays in the same parallax direction in the viewing zone, and having different numbers of horizontal pixels; and recording n combined images with the same numbers of vertical and horizontal pixels as a unit to be converted into a parallax interleaved image, the n combined images being formed by combining one or more parallax component images with parallax directions different from each other by n.

According to a third aspect of the present invention, there is provided a reproducing method for a stereoscopic image, with parallaxes being given in a horizontal direction but not given in a vertical direction, the stereoscopic display device including:

a display unit that has a display face on which a parallax interleaved image for stereoscopic display is displayed, with pixels being arranged with a first horizontal pitch in the horizontal direction; and a parallax barrier that has linear optical apertures disposed to face the display face and arranged with a second horizontal pitch in the horizontal direction, the optical apertures inclined from the vertical direction, the second horizontal pitch being equal to an integer multiple (n) of the first horizontal pitch, the parallax barrier directing light rays emitted from pixels at horizontal intervals of n pixels as parallel light rays toward the viewing zone, the method comprising:

preparing a parallax component image data representing n or more parallax component images, each having accumulated pixels that cause the pixels to generate the parallel light rays in the same parallax direction in the viewing zone, and having different numbers of horizontal pixels;

recording n combined images with the same numbers of vertical and horizontal pixels, the n combined images being formed by combining one or more parallax component images with parallax directions different from each other by n; and displaying a parallax interleaved image on the display face after converting the n combined images into the parallax interleaved image.

According to a fourth aspect of the present invention, there is provided a reproducing method for a stereoscopic image, with parallaxes being given in a horizontal direction but not given in a vertical direction, the stereoscopic display device including:

a display unit that has a display face on which a parallax interleaved image for stereoscopic display is displayed, with pixels being arranged with a first horizontal pitch in the horizontal direction; and a parallax barrier that has linear optical apertures disposed to face the display face and arranged with a second horizontal pitch in the horizontal direction, the optical apertures inclined from the vertical direction, the second horizontal pitch being equal to an integer multiple (n) of the first horizontal pitch, the parallax barrier directing light rays emitted from pixels at horizontal intervals of n pixels as parallel light rays toward the viewing zone, the method comprising:

preparing a parallax component image data representing n or more parallax component images, each having accumulated pixels that cause the pixels to generate the parallel light rays in the same parallax direction in the viewing zone, and having different numbers of horizontal pixels;

recording an ultimate combined image that is formed by combining n combined images having the same numbers of vertical and horizontal pixels, the n combined images being formed by combining one or more parallax component images with parallax directions different from each other by n; and displaying a parallax interleaved image on the display face after converting the ultimate combined image into the parallax interleaved image.

According to a fifth aspect of the present invention, there is provided a computer-executable program for recording stereoscopic image data for a stereoscopic display device that displays a stereoscopic image, with parallaxes being given in a horizontal direction but not given in a vertical direction, the program comprising instructions for:

preparing a parallax component image data representing n or more parallax component images, each having accumulated pixels that cause the pixels to generate the parallel light rays in the same parallax direction in the viewing zone, and having different numbers of horizontal pixels; and recording n combined images with the same numbers of vertical and horizontal pixels, the n combined images being formed by combining one or more parallax component images with parallax directions different from each other by n.

According to a sixth aspect of the present invention, there is provided a computer-executable reproducing program for displaying a stereoscopic image, with parallaxes being given in a horizontal direction but not given in a vertical direction, the program comprising instructions for:

preparing a parallax component image data representing n or more parallax component images, each having accumulated pixels that cause the pixels to generate the parallel light rays in the same parallax direction in the viewing zone, and having different numbers of horizontal pixels;

recording n combined images with the same numbers of vertical and horizontal pixels, the n combined images being formed by combining one or more parallax component images with parallax directions different from each other by n; and displaying a parallax interleaved image on a display unit after converting the n combined images into the parallax interleaved image.

According to a seventh aspect of the present invention, there is provided a computer-executable reproducing program for displaying a stereoscopic image, with parallaxes being given in a horizontal direction but not given in a vertical direction, the program comprising instructions for:

preparing a parallax component image data representing n or more parallax component images, each having accumulated pixels that cause the pixels to generate the parallel light rays in the same parallax direction in the viewing zone, and having different numbers of horizontal pixels;

recording an ultimate combined image that is formed by combining n combined images having the same numbers of vertical and horizontal pixels, the n combined images being formed by combining one or more parallax component images with parallax directions different from each other by n; and displaying a parallax interleaved image on a display unit after converting the ultimate combined image into the parallax interleaved image.

DESCRIPTION OF THE PREFERRED EMBODIMENTS

The following is a description of embodiments of the present invention, with reference to the accompanying drawings.

Referring first to FIGS. 1 through 7, an IP display device and a display method are described.

Figure 1:
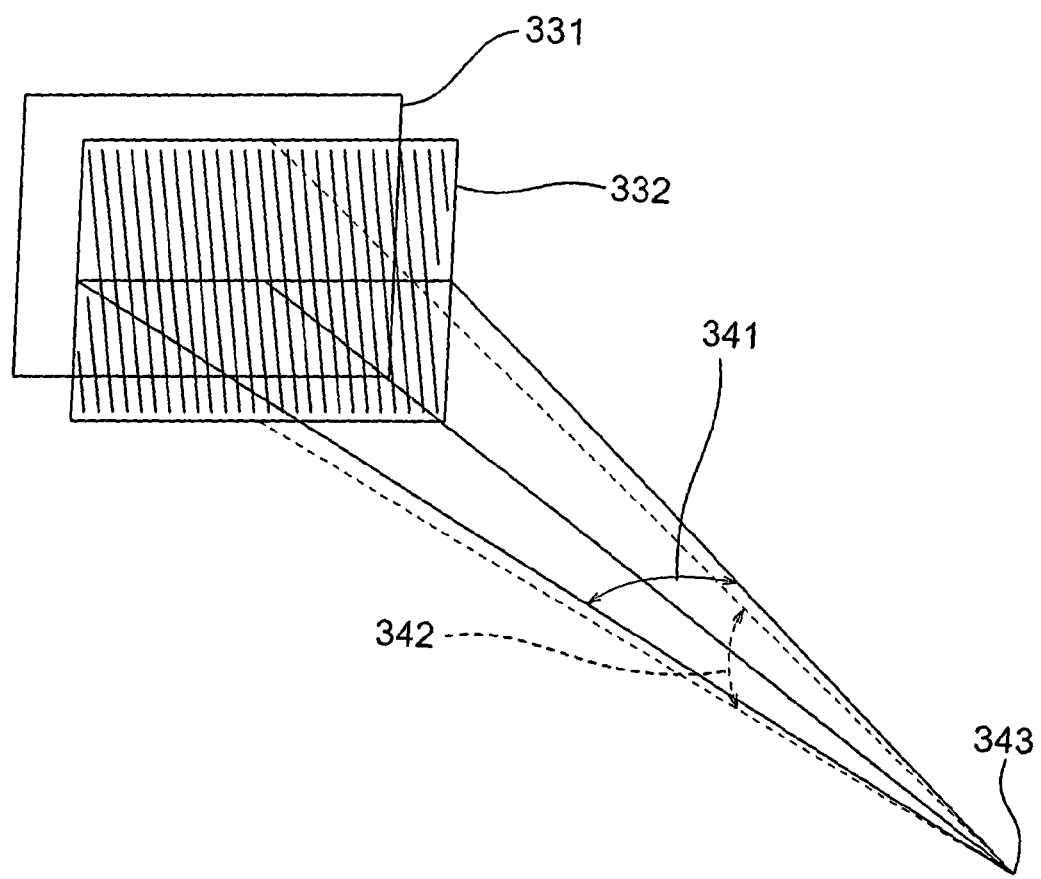
FIG. 1 is a schematic perspective view of an entire stereoscopic display device in which a stereoscopic image recording method and a reproducing method according to one embodiment of the present invention are applied.

FIG. 1 is a schematic perspective view of a stereoscopic display device. The display device that displays a stereoscopic image illustrated in FIG. 1 is equipped with a flat image display unit 331 that displays a parallax interleaved image (an elemental image array) as a flat image. A parallax barrier 332 that controls light beams from the flat image display unit 331 is provided on the front face of the display unit 331. The parallax barrier 332 may be a lenticular sheet 334 illustrated in FIG. 2A or a slit sheet 333 illustrated in FIG. 2B. Here, the lenticular sheet 334 or the slit sheet 333 is referred to as the parallax barrier 332. The parallax barrier 332 has optical apertures. Where the parallax barrier 332 is the lenticular sheet 334, the optical apertures are equivalent to the cylindrical lenses. Where the parallax barrier 332 is the slit sheet 333, the optical apertures are equivalent to the slits formed in the slit sheet 333. The optical apertures of the parallax barrier 332 practically restrict the light beams emitted from the display unit 331 onto the viewing zone in which a stereoscopic image is to be observed. The optical apertures are provided for the elemental images constituting a two-dimensional image displayed on the display unit 331. Accordingly, the parallax interleaved image displayed on the display unit 331 are formed with the elemental images that are the same in number as the optical apertures of the parallax barrier 332. As a result, the elemental images are projected into the space in the viewing zone via the optical apertures of the parallax barrier 332, so that a stereoscopic image is displayed on the front face of the back face of the stereoscopic display device.

The parallax barrier 332 may be provided on the back face side of the flat image display unit 331.

This stereoscopic display device is of a one-dimensional IP type. When seen from a viewpoint 343 located on an predetermined viewing distance L, a stereoscopic image to which a horizontal disparity is applied but a vertical disparity is not applied is observed. FIG. 3(a) shows the front face of the stereoscopic display device, and a control unit that includes a driving unit 310, a storage unit 312, and an image processing unit 314. FIG. 3(b) shows the arrangement of the optical systems in the horizontal plane of the stereoscopic display device, and a line group 346 that represents the relationship among the elemental image average width Pe, the second horizontal pitch (the horizontal pitch of the apertures of the parallax barrier) Ps, the viewing distance L, and the viewing zone width W. FIG. 3(c) schematically shows the angle of view in the vertical plane in the viewing space, with respect to the display unit 331 of the stereoscopic display device shown in FIG. 3(a).

Figure 2A:
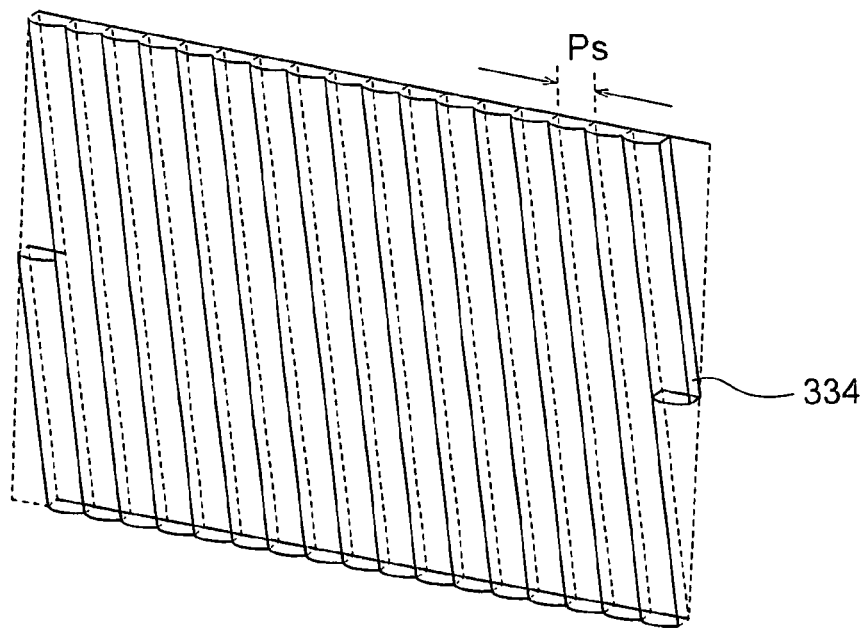
FIG. 2A is a schematic perspective view of a lenticular sheet that serves as the parallax barrier shown in FIG. 1.
Figure 2B:
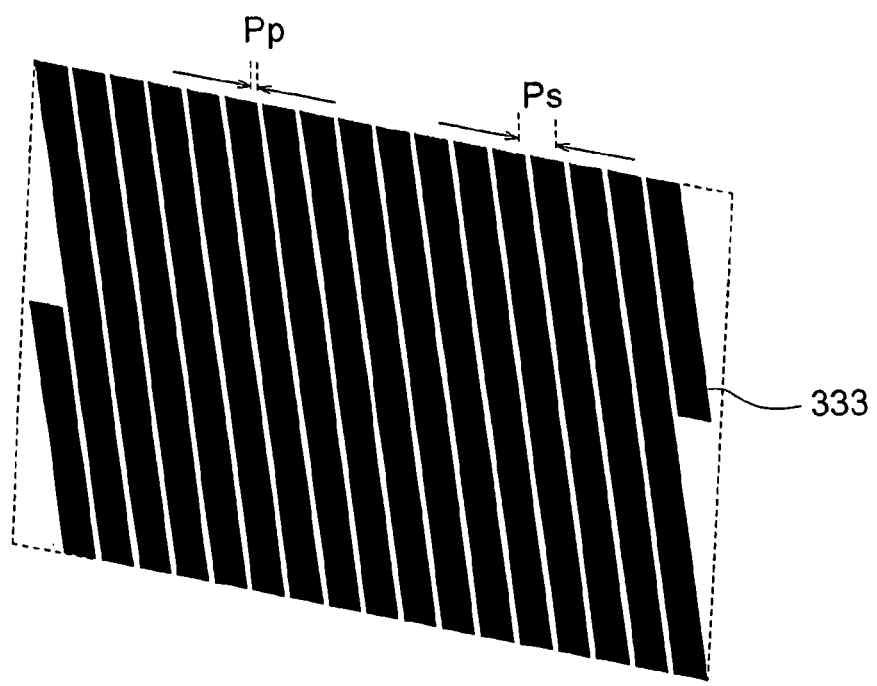
FIG. 2B is a schematic perspective view of a slit sheet that serves as the parallax barrier shown in FIG. 1.

As shown in FIGS. 1 and 3(b), the stereoscopic display device includes the flat image display unit 331 that displays a flat image such as a liquid crystal display unit, and the parallax barrier 332 having optical apertures, as described above. The parallax barrier 332 is formed with the lenticular sheet 334 or the slit sheet 333 that has the optical apertures each linearly inclined from the vertical direction and cyclically arranged in a direction deviated from the horizontal direction, as shown in FIGS. 2A and 2B. In a projection-type display device, this parallax barrier 332 is formed with a curved mirror array, or the like. In this stereoscopic display device, the display unit 331 is observed from the eye position 343 via the parallax barrier 332 within the range of the horizontal viewing angle 341 and the range of the vertical viewing angle 342, so that a stereoscopic image can be observed in the area of the front side and the back side of the flat image display unit 331. Here, the number of pixels of the flat image display unit 331 is 1920 in the transverse (horizontal) direction, and is 1200 in the longitudinal (vertical) direction, if counted by a square minimum unit. The pixels of each minimum unit contain pixels of red (R), green (G), and blue (B). In this specification, a "pixel" means the minimum unit for controlling luminance independently in one frame on the display face. On the other hand, the sub-pixels of red (R), green (G), and blue (B) are "pixel" in a conventional direct-viewing transmissive liquid crystal panel.

In FIG. 3(b), the width of each elemental image is determined only after the distance (viewing distance) L between the parallax barrier 332 and the viewing distance plane 343, the parallax barrier pitch (the horizontal pitch of the optical apertures of the parallax barrier 332) Ps, and a parallax barrier gap d are determined. More specifically, the elemental image average pitch Pe is determined by the distances between the viewing point on the viewing distance plane 343 and the projected points of the center points of the apertures projected onto the flat image display unit 331 along the straight line extending toward the mid point of each two adjacent apertures (the optical apertures of the parallax barrier 332). Reference numeral 346 indicates the lines connecting the viewing point and the center points of the apertures, and the viewing zone width W is determined under the condition that the elemental images do not overlap one another on the display surface of the flat image display unit 331. As already mentioned, the elemental images are equivalent to an interleaved image (part of a parallax interleaved image) formed with pixels that generate a bundle of light rays toward the viewing zone between the parallax barrier 332 and the viewing distance plane 343 via an optical aperture of the parallax barrier 332. The elemental images are displayed on the display unit 331, and the displayed image is projected to obtain a stereoscopic image.

The flat image display unit 331 is driven on receipt of a display signal from the driving circuit 310, so that the parallax interleaved image is displayed on the flat image display unit 331. This driving circuit 310 has the storage unit 312 as a peripheral device that compresses a combined image formed with parallax component images (explained later) and stores the compressed combined image as stereoscopic image data. This driving circuit 310 also has the image processing unit 314 as a peripheral device that decompresses the compressed stereoscopic image data from the storage unit 312, converts the image data into a decompressed combined image, further converts the decompressed combined image into a parallax interleaved image, and thus extracts pixel data.

In the structure of a parallel-ray one-dimensional IP type in which the horizontal pitch Ps of the apertures is set at an integral multiple of the pixel pitch Pp, the average pitch Pe of the elemental images is not an integral multiple of the pixel pitch Pp, but has a fraction. In a structure of a general one-dimensional IP type in which the horizontal pitch Ps of the apertures is not set at an integral multiple of the pixel pitch Pp (not forming parallel light rays), the average pitch Pe of elemental images is not an integral multiple of the pixel pitch Pp either, and normally has a fraction. In a structure of a multiview type, on the other hand, the average pitch Pe of elemental images is set at an integral multiple of the pixel pitch Pp. In a structure of a one-dimensional IP type, the integral quotient obtained by dividing the average pitch Ps of apertures by the pixel pitch Pp is referred to as "the number of parallaxes".

As illustrated in FIGS. 4(a) through 5(c), each elemental image is formed with pixel columns extracted from the parallax component image 426 corresponding to the direction of the corresponding group of parallel light rays. As is apparent from the drawings, a parallax interleaved image 427 for displaying a stereoscopic image is formed with a group of elemental images (also referred to as an elemental image array), and is also formed with a large number of parallax component images 426 that constitute the elemental images.

FIGS. 4(a), 4(b), and 4(c) illustrate the method of producing a parallax interleaved image based on parallax component images in a structure of a parallel-ray one-dimensional IP type. As shown in FIG. 4(a), an object 421 to be displayed is projected onto a projection plane 422 provided actually on the plane on which the parallax barrier 332 of the stereoscopic display device is disposed. In a structure of a one-dimensional IP type, an image is projected along projection lines 425 that extend toward a projection center line 423 that run in parallel with the projection plane 422 and locate at the center of the plane of the viewing distance L, so that the vertical direction is perspectively projected and the horizontal direction is orthographically projected. In this projection, the projection lines 425 do not cross one another in the horizontal direction, but do cross one another in the vertical line on the projection center line 423. By this projecting technique, the vertical direction of the object 421 is perspectively projected, and the horizontal direction of the object 421 is orthographically projected, so that an object image 424 as shown in FIG. 4(b) is formed on the projection plane 422. In FIG. 4(a), the object image 424 as shown in FIG. 4(b) corresponds to an image projected in a projecting direction 428 denoted by reference numeral 1. In the structure of a one-dimensional IP type, the images 424 of the object 421 projected in several directions are required, as shown in FIG. 4(a).

The projected image or the parallax component image 426, which is equivalent to the image of one direction in the image formed by perspectively projecting the vertical direction of the object 421 onto the projection plane 422 and orthographically projecting the horizontal direction of the object 421 onto the projection plane 422, is divided into pixel columns that extend in the vertical direction, as shown in FIG. 4(b). The pixel columns are then allotted to each elemental image corresponding to an optical aperture, and are placed in the parallax interleaved image 427. The parallax component images 426 are arranged at intervals that are equivalent to the aperture pitch Ps (the horizontal pitch Ps of the optical apertures), in terms of the length of the display face 427 of the display device. Since the optical apertures are diagonally arranged, the corresponding columns among the parallax component images 426 are arranged virtually in the vertical direction in the parallax interleaved image 427, but are arranged diagonally in each parallax component image 426 so as to match the corresponding optical apertures.

The necessary resolution of each parallax component image 426 is 1/(the number of parallaxes) of the parallax interleaved image 427. So as to make the vertical resolution equal to the horizontal resolution at the time of 3D display, the number of parallaxes should preferably be the square of an integer m, and each of the horizontal and vertical resolutions of each parallax component image with respect to the parallax interleaved image should preferably be 1/m. FIGS. 5(a), 5(b), and 5(c) illustrate a case where the number of parallaxes is 16. In this case, the number of horizontal pixels of the parallax interleaved image 427 is 1920, and the number of horizontal pixels of each parallax component image 426 is 480, which is ¼ of the horizontal pixels 1920 of the parallax interleaved image 427. As shown in FIGS. 5(a) and 5(b), the RGB sub-pixels of each parallax component image (a camera image) obtained at the time of shooting are arranged in the transverse direction (or in rows), but the sub-pixel data of the RGB sub-pixels are rearranged in a diagonal direction (a direction virtually equal to the direction of the optical apertures) in the parallax interleaved image 427 and are allotted to the pixels in the diagonal direction. With this conversion allotment, the horizontal resolution in stereoscopic display in a structure of a one-dimensional IP type involving only the horizontal parallaxes can be increased.

The horizontally adjacent pixels (sets of RGB being horizontally adjacent to one another) of each parallax component image 426 are arranged at intervals of 3m of sub-pixels on the parallax interleaved image 427. This process is repeated for the other projecting directions 428, so that the entire parallax interleaved image as a two-dimensional image to be displayed on the display face 427 is completed as shown in FIG. 5(c). Although only the eight directions −4, −3, −2, −1, 1, 2, 3, and 4 are shown as the projecting directions 428 in FIG. 4(a), several tens of directions may be necessary depending on the viewing distance. In the example with the sixteen parallaxes illustrated in FIGS. 5(a) through 7, twenty-six directions are necessary. For a projected image, which is a parallax component image 426, the number of pixels columns which is 1/m, is the largest possible number of pixel strings of the parallax interleaved image 427. However, it is only necessary to create the image data of the columns in the necessary ranges of the respective projecting directions. The necessary ranges will be described later, with reference to FIG. 10.

The projecting directions 428 shown in FIG. 4(a) correspond to the parallax directions in which the parallax component images 426 identified by parallax numbers are viewed. The projecting directions 428 are not equiangularly set, but the projection center points (the camera positions) are set at regular intervals on the viewing distance plane, as will be described later with reference to FIG. 17. More specifically, shooting is performed with a camera moving in parallel (in a fixed direction) on the projection center line 423 at regular intervals, so that the projection center points are set at regular intervals.

Figure 6:
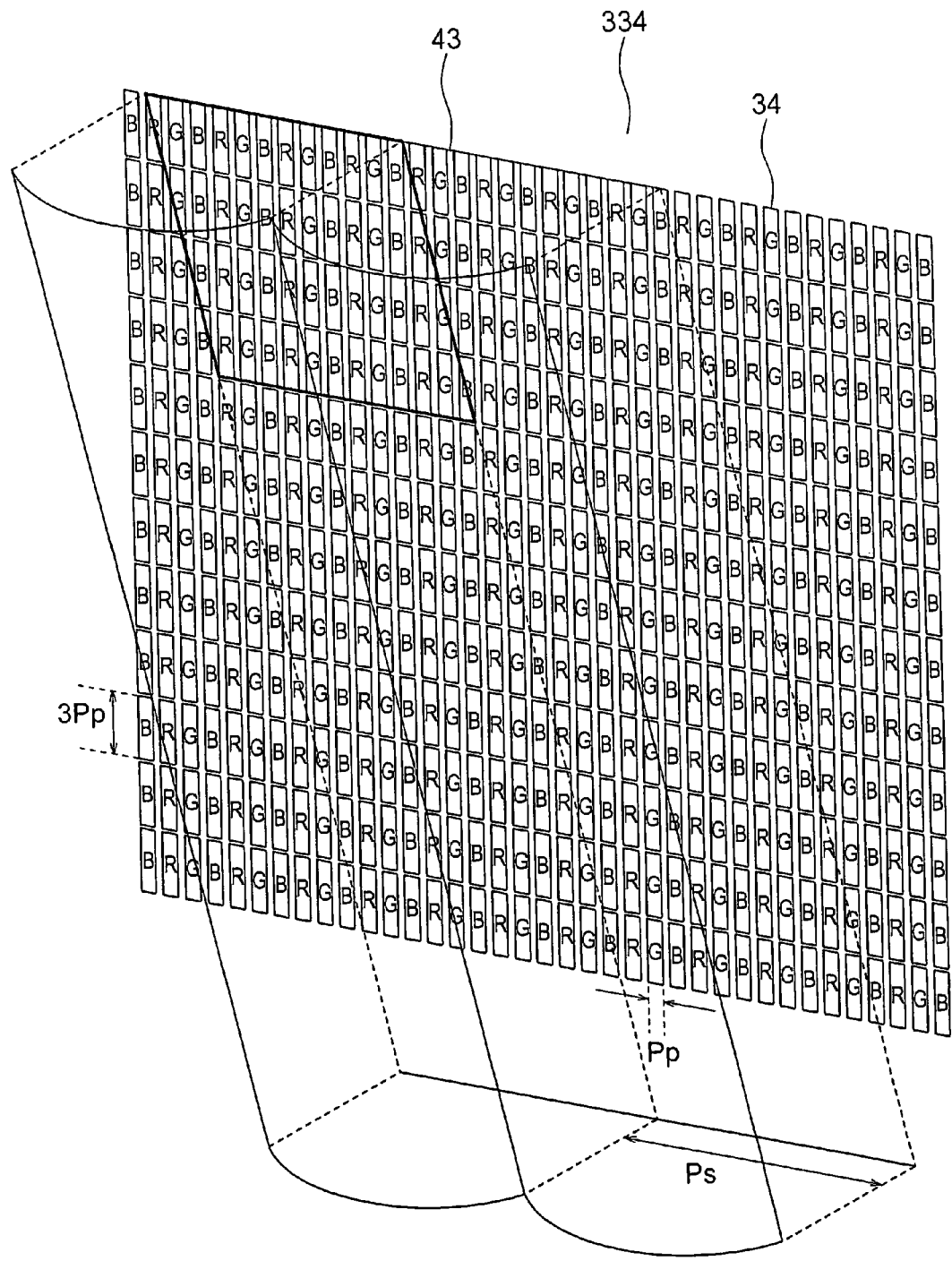
FIG. 6 is a schematic perspective view of part of a stereoscopic display device in which a stereoscopic image recording method and a reproducing method are applied.

FIG. 6 is a schematic perspective view of a part of the stereoscopic display device. In the example illustrated in FIG. 6, the lenticular sheet 334 that is formed with a cylindrical lens having optical apertures extending in a diagonal direction (angle=arctan (¼)) is provided as the parallax barrier 332 on the front face of the display face of a flat parallax image display unit such as a liquid crystal panel. On the display face of the display device, pixels 34 are linearly arranged in both the horizontal and vertical directions in a matrix fashion, with the horizontal to vertical ratio being 3 to 1. The pixels 34 are arranged so that red (R), green (G), and blue (B) repeatedly appear in this order in each row. This color arrangement is generally called a stripe arrangement.

Figure 7:
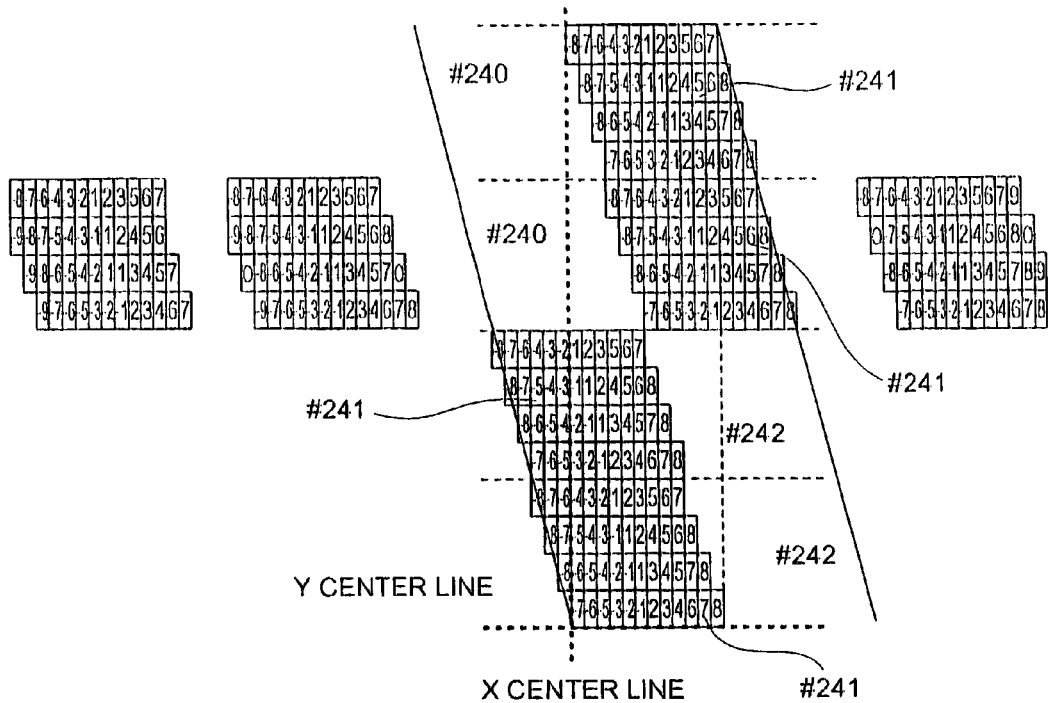
FIG. 7 is a schematic enlarged plan view of an example of the arrangement of elemental images and effective pixels on the display device shown in FIG. 6.
Figure 7:
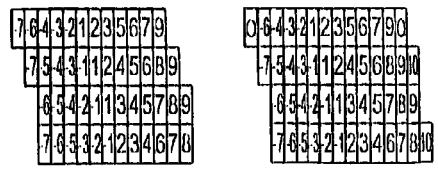

FIG. 7 is an enlarged plan view of an example of the pixel arrangement on the display face shown in FIG. 6. In FIG. 7, numerals −8 to 8 allotted in each pixel 34 indicate the parallax numbers identifying the parallax component images described with reference to FIG. 4, and each two adjacent parallax numbers are adjacent to each other in a diagonal direction. In the arrangement illustrated in FIG. 7, one vertical cycle is formed with sixteen rows, and each four rows represent the 3D vertical resolution.

On the display screen shown in FIG. 6, each twelve columns and four rows of pixels 34 constitute one effective pixel 43 (one effective pixel 43 is framed by a bold line in FIG. 6). As each effective pixel 43 is formed with forty-eight pixels in the structure of this display unit, stereoscopic display with sixteen parallaxes in the horizontal direction can be performed, with three pixels of RGB being the minimum unit of parallax information.

In a structure of a parallel-ray one-dimensional IP type, an integral multiple of the pixel pitch Pp, for example, twelve-pixel pitch is made equal to the parallax barrier pitch Ps, and the light rays emitted via the optical apertures of the parallax barriers 332 form a set of parallel light rays. In this design, the boundaries between elemental images appear at slightly longer intervals (at the intervals of 12.016 pixels, for example) than the total width of twelve pixels. However, since each effective pixel 43 is defined by a unit of pixels 34, the width of each effective pixel 43 is set equal to the total width of twelve columns (forty-eight pixels) or 12.75 columns (fifty-one pixels), depending on the horizontal position on the display face, as shown in FIG. 7. More specifically, the average value of the elemental image pitch is larger than the total width of twelve pixels, and the horizontal pitch of the parallax barrier 332 is set equal to the total width of twelve pixels. The shape of each effective pixel 43 consisting of forty-eight pixels also varies with the horizontal position on the display face. FIG. 7 shows an example of the shape of an elemental image (an effective pixel consisting of forty-eight pixels) in the center of the screen in the horizontal direction, and five examples of the shapes of effective pixels (each consisting of forty-eight pixels or fifty-one pixels) outside the center region in the horizontal direction.

Referring now to FIGS. 8 through 17, the structure of image data obtained by converting a parallax interleaved image displayed on the display unit 331 into a suitable format for compression is described.

Figure 8:
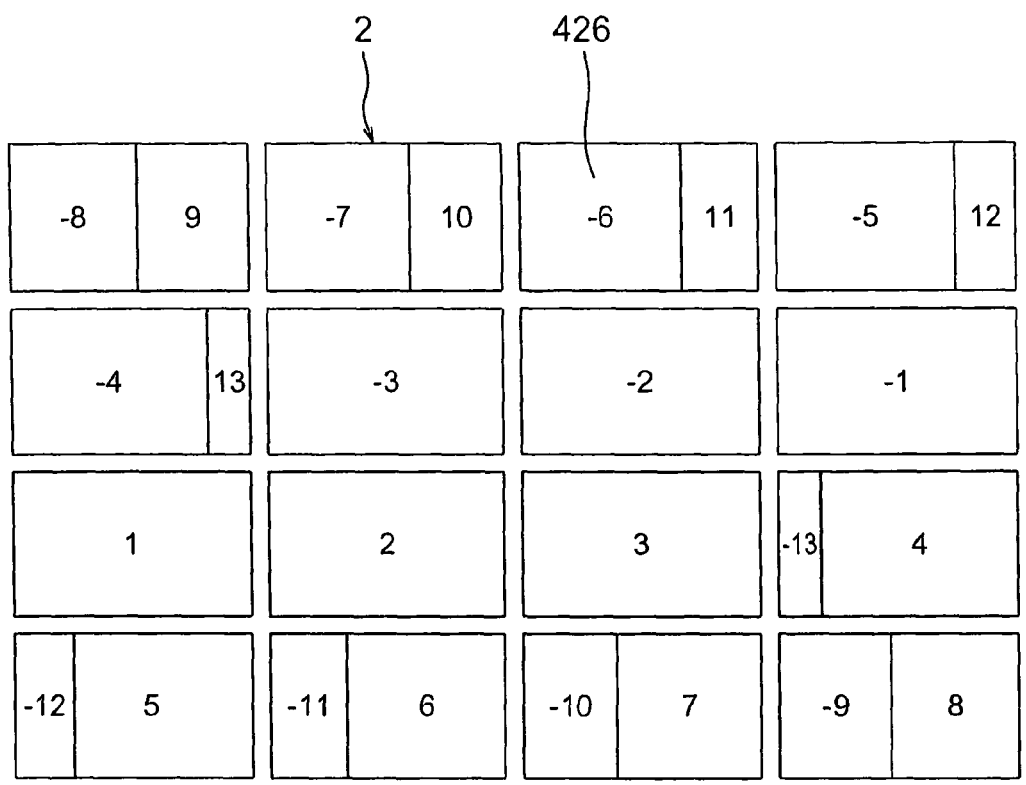
FIG. 8 is a plan view of the arrangement of combined images having the same numbers of vertical and horizontal pixels that is suitable for recording a stereoscopic image for which a stereoscopic image recording method according to one embodiment of present invention is applied.

FIG. 8 shows n (n=16 in this example) of combined images 2 that have the same number of pixels in the horizontal and vertical direction, and are suitable for recording a stereoscopic image. The method of recording a stereoscopic image according to the present invention is applied for the combined images 2. Since n is equal to the number of parallaxes, the number of combined images 2 will be hereinafter referred to as the number of parallaxes n. Each of the combined images 2 includes one parallax component image 426 or a combination of several parallax component images 426 (#+13 to #+1 and #−1 to #−13). The n of combined images 2 have such a formatted data structure that can be readily converted into one parallax interleaved image 427 to be displayed on the flat image display unit 331. The combined images 2 are then distributed on the display unit 331 according to the divided arrangement of the parallax component images and the divided arrangement method described with reference to FIGS. 4(a) through 5(c). Thus, the combined images 2 can be converted into a parallax interleaved image.

Figure 9:
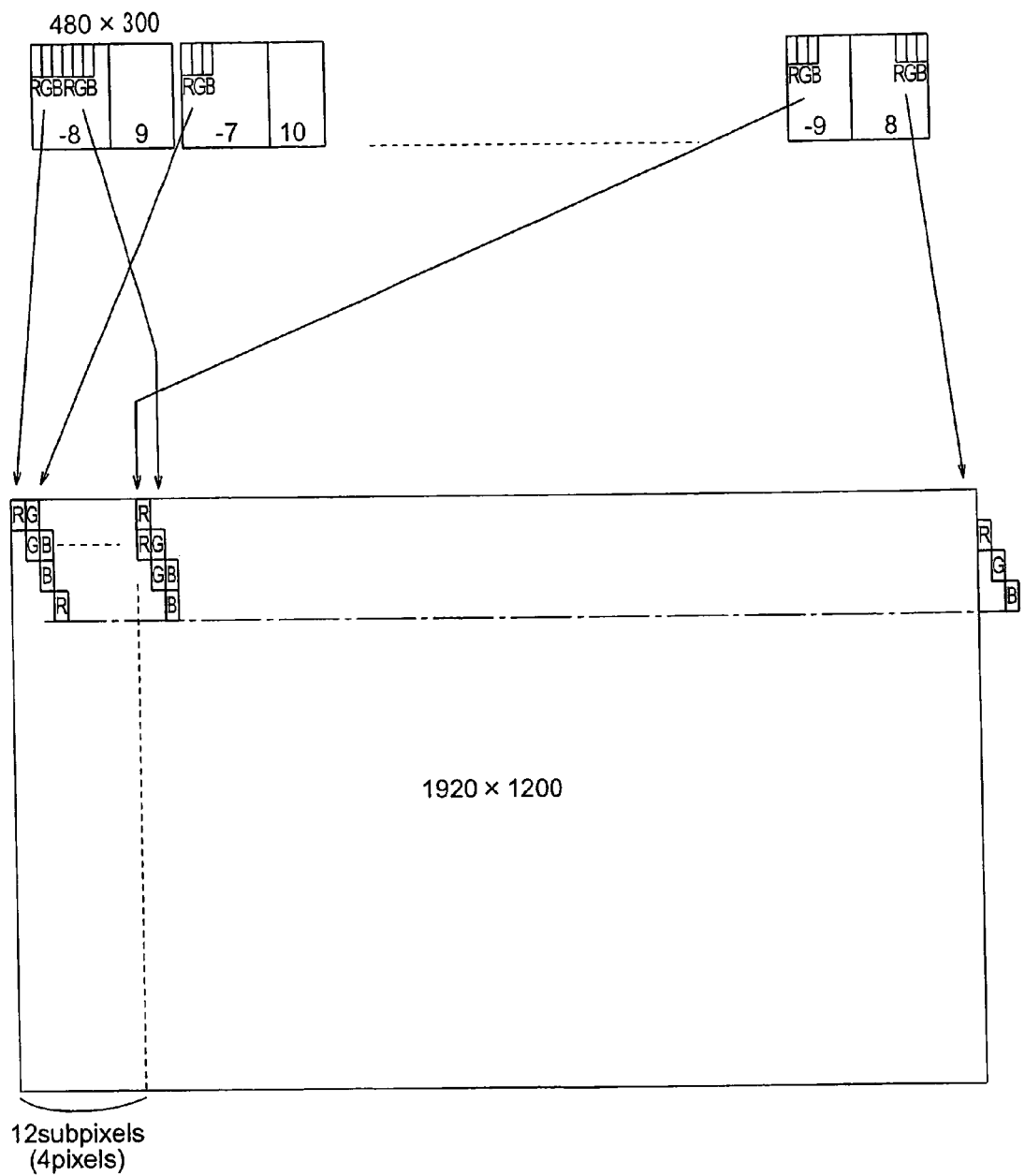
FIG. 9 schematically illustrates a method of allotting combined images in a parallax interleaved image according to one embodiment of the present invention.

This conversion method is illustrated in FIG. 9. The image data of the one combined image row including the camera image (#−8) at the rightmost end in the viewing zone (the leftmost end in FIG. 9) is placed at every twelve pixels from the first column at the leftmost end in the parallax interleaved image until the rightmost end, while the RGB pixels are diagonally rearranged. The image data of the one combined image row including the camera image (#−7) at the second rightmost end in the viewing zone is continuously placed next to the pixels already placed and is arranged at every twelve pixels until the rightmost end, while the RGB pixels are diagonally rearranged. This conversion is sequentially performed. Lastly, the image data of the one combined image row including the camera image (#8) at the leftmost end in the viewing zone is continuously placed next to the pixels already placed and is arranged at every twelve pixels until the rightmost end, while the RGB pixels are diagonally rearranged. In FIG. 9, part of the image data runs out of the screen. Each one row of the combined images is contained in the range of four rows in the parallax interleaved image. The second row of the combined images is converted virtually in the same manner as the above, but the placement starting position at the leftmost end in the parallax interleaved image shifts to the right by three pixels. Thus, the placement shown in FIG. 7 is performed. The third row of the combined images is converted in the same manner as the above, except that the placement starting position at the leftmost end in the parallax interleaved image shifts to the left by six pixels. The fourth row of the combined images is also converted in the same manner as the above, except that the placement starting position at the leftmost end in the parallax interleaved image shifts to the left by three pixels. As for the fifth row of the combined images, the placement starting position at the leftmost end in the parallax interleaved image is the same as the placement starting position for the first row. In this manner, the same conversion is cyclically performed on each four rows of the combined images (each sixteen rows in the parallax interleaved image), so as to complete the placement on the entire area of the parallax interleaved image. However, a different interpolation might be added to the converting process for each row of the combined images, as will be described later.

Through the above described conversion, the sixteen combined images can be processed in the same manner as the processing of 16-view images by the multiview method, and can be converted into a parallax interleaved image by exactly the same interleaving process. Here, the combined images 2 of the arrangement illustrated in FIG. 8 are recorded on a storage medium, or intra-frame compression is performed on the combined images 2 of the arrangement, or inter-frame compression is performed by correlating the combined images 2 with other combined images 2 of another arrangement. Further, compression may be performed by correlating adjacent combined images with one another. By doing so, the compression rate is increased, but the decompressing load becomes larger.

The reference numerals (#13 to #1 and #−1 to #−13) in FIG. 8 indicate the numbers allotted to the parallax component images 426 (the same numbers as the camera numbers). It should be noted that, when the combined images are identified hereinafter, the combinations of the numbers (#13 to #1 and #−1 to #−13) allotted to the parallax component images 426 are used. In FIG. 8, for example, the combined image 2 located at the upper-left end is identified as the combined image (#−8, #+9), and the combined image 2 that is located on the leftmost and is the third from the top is identified as the combined image (#+1).

In a structure of a one-dimensional IP type that emits parallel light rays in the horizontal direction, the parallax barrier 332 (a lenticular sheet) is provided on the front face of the display panel. The parallax barrier 332 linearly extends so that the optical apertures (the cylindrical lenses of the lenticular sheet) are arranged with a horizontal pitch that is equal to an integral multiple, for example, a twelvefold, of the horizontal pitch of the pixels (sub-pixels in this example) arranged in the display plane.

Figure 10:
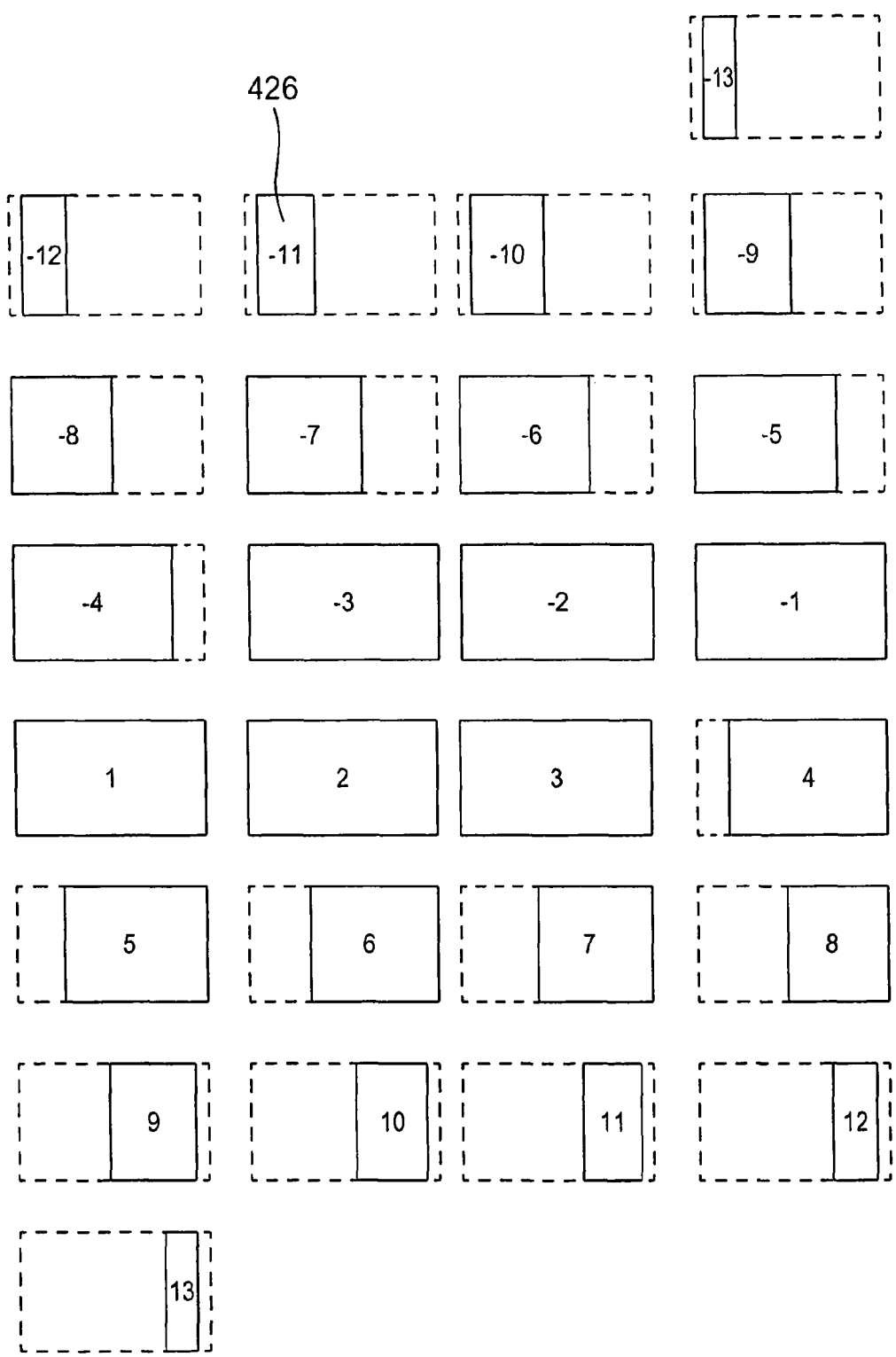
FIG. 10 is a schematic plan view of parallax component images to be processed by the stereoscopic image recording method according to one embodiment of the present invention.

In the structure of the one-dimensional IP type, the light rays emitted from the pixels that are arranged at intervals of twelve (an integral multiple) pixels in the horizontal direction of the display face are directed to the viewing zone, so as to reproduce a stereoscopic image. The number of parallax component images 426 combining the image data of the set of pixels constituting the parallel light rays in the same parallax direction is set to 26, which is larger than 16 (=12×4 (rows)/3 (color components)). As shown in FIG. 10, the numbers of pixels in the horizontal direction (the valid pixel ranges) vary among the parallax component images 426 (#−13 to #−1 and #+1 to #+13).

Figures 11, 12:
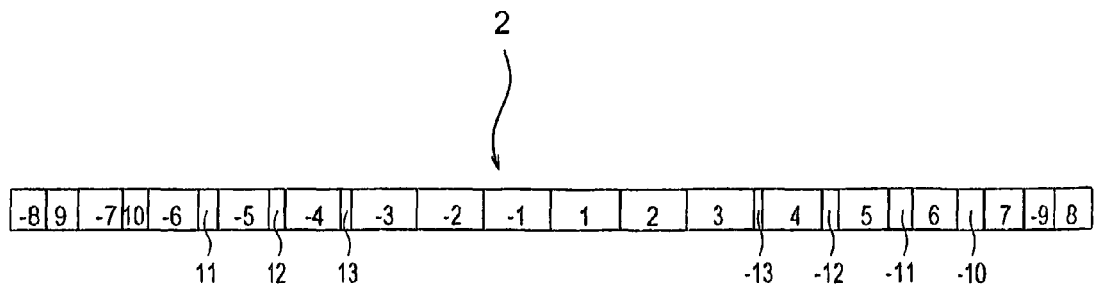
FIG. 11 illustrate the data ranges of parallax component images and the locations of the parallax components images in a parallax interleaved image formed by the stereoscopic image recording method according to one embodiment of the present invention.
FIG. 12 is a schematic plan view of the format of an ultimate combined image formed by a modification of the stereoscopic image recording method according to one embodiment of the present invention.

FIG. 10 shows the sizes of the valid pixel ranges among the camera images including the twenty-six parallax component images 426. In FIG. 10, the solid lines indicate the valid pixel ranges of the parallax component images 426, and the broken lines indicate the camera image sizes equivalent to the display resolutions at the time of stereoscopic display (or the number of vertical and horizontal pixels corresponding to the projection plane at the time of shooting). The number of vertical and horizontal pixels is set at 480 (in the horizontal direction)× 300 (in the vertical direction) pixels (not sub-pixels). All the parallax component images 426 have the same total number of vertical pixels, but vary in the number of horizontal pixels. FIG. 11 shows the specific values of the valid pixel ranges. The viewer position (the viewing zone) from which a stereoscopic image can be viewed at a viewing distance is equivalent to the width of the position in which the center sixteen cameras among the twenty-six cameras are located. The pixel ranges corresponding light rays that fall in the viewing zone are the valid pixel ranges.

Figure 17:
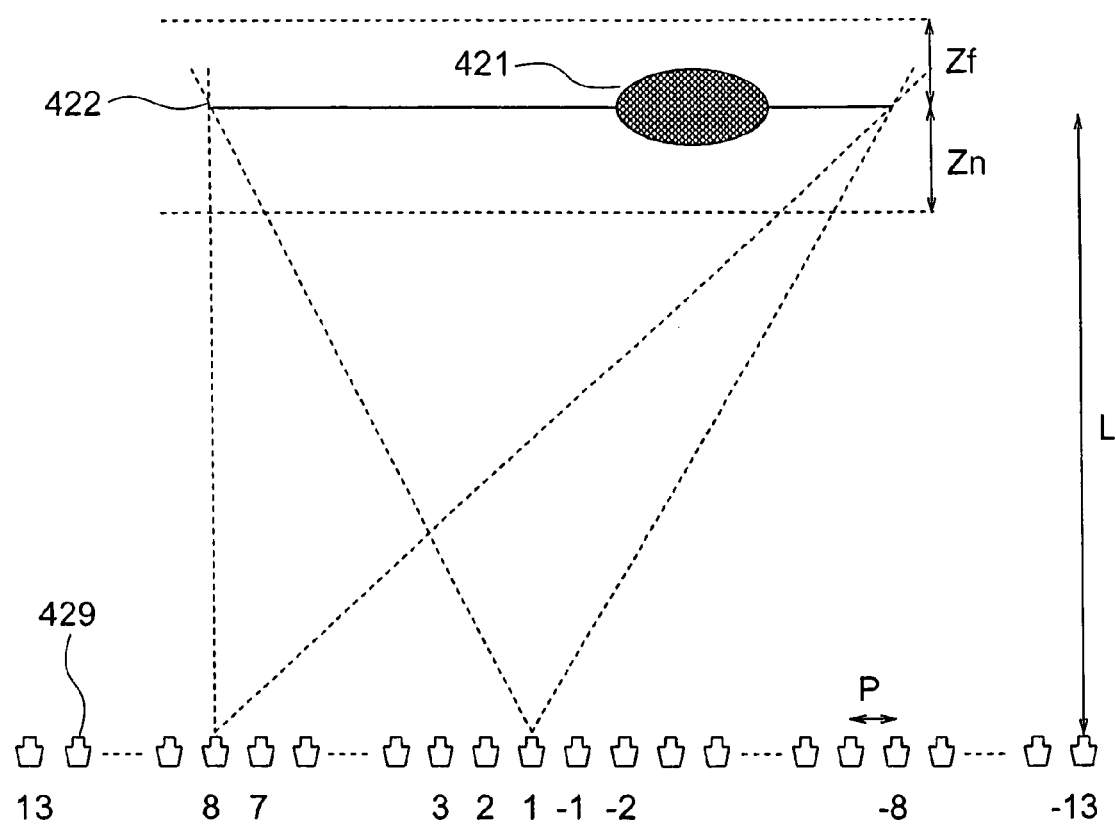
FIG. 17 schematically illustrates a shooting method for obtaining the parallax component images shown in FIG. 10.

The parallax component images 426 that form the combined images 2 shown in FIG. 10 are cropped from images that are formed in the range of the common projection plane 422 by the cameras set at an predetermined viewing distance L from the projection plane 422 (equivalent to the plane which focus on the object 421) as shown in FIG. 17. All the cameras are set in the horizontal direction, and have the common projection plane. Therefore, shift lens shooting or cropping after wide-angle shooting is employed as the shooting method.

In FIG. 17, the shooting positions of the cameras are denoted by the camera numbers (#1 to #13 and #−1 to #−13) shown in FIG. 10. As shown in FIG. 10, the camera numbers (the parallax numbers) are allotted so that number 0 is omitted in the case of n is an even number, and the positive numbers and the negative numbers are allotted symmetrically about the center of the front face of the display plane 422. When a camera takes an image of the object 421 in the same projection plane while being moved at regular intervals on the horizontal shooting standard line located at the predetermined viewing distance L from the object 421, an image of a space that contains the object 421 is taken. Since the camera #1 and the camera #−1 are located virtually at the center of the horizontal shooting standard line, the images (parallel light rays) taken by the camera #1 and the camera #−1 fall in the viewing zone and the range of all the pixels taken by the camera #1 and the camera #−1 are used as the parallax component images 426 denoted by #1 and #−1. As the camera number becomes larger or smaller, the range that does not fall in the viewing zone increases among the images projected onto the projection plane 422. As a result, the valid pixel ranges as the parallax component images 426 decrease, while the invalid pixel ranges not to be used as the parallax component images 426 increase among the projected images. For example, the images taken by the camera #8 and the camera #−8 exhibit virtually the same angle of view, but the images (parallel light rays) that fall in the viewing zone are approximately ½ of the entire images. As a result, the parallax component images 426 are formed with approximately ½ of the taken images and the rest of the taken images become invalid pixel ranges.

FIG. 10 shows the relationship among the actually taken images and the parallax component images 426. As shown in FIG. 10, as the camera number becomes larger or smaller, the horizontal pixel range that is valid as a parallax component image 426 cropped from the actually taken image decreases, while the invalid pixel range increases. Where the cameras are moved at regular intervals on the horizontal shooting standard line, the valid and invalid ranges of the parallax component images 426 that exhibit a complementary relationship among them as shown in FIG. 10 are formed between the pixel ranges to be used as the parallax component images 426 cropped from the actually taken images and the invalid pixel ranges not to be used as the parallax components images 426. For example, the valid and invalid ranges of the parallax components image 426 are formed in the images taken by the camera #−5. Here, the invalid range is equal to the valid range of the parallax component image 426 of the image taken by the camera #12. Accordingly, the combined number of pixels in the parallax components images 426 of the images taken by the cameras #−5 and #12 is equal to the number of vertical and horizontal pixels in the parallax component image 426 of the image taken by the camera #1.

The combined images 2 shown in FIG. 8 have the same number of vertical and horizontal pixels, since the parallax component images 426 cropped from the actually taken images shown in FIG. 10 are combined. As is apparent from the comparison among the sizes (the numbers of vertical and horizontal pixels) of the parallax component images 426 shown in FIG. 10, the combinations of the parallax component images 426 denoted by parallax numbers that are different from each other by 16 can be converted into the sixteen combined images 2 having the same numbers of vertical and horizontal pixels. For example, the combined image 2 at the upper left end in FIG. 8 is equivalent to the combination of the parallax component images 426 denoted by #−8 and #9 that differ by 16 in parallax number. The combined image 2 at the upper right end in FIG. 8 is equivalent to the combination of the parallax component images 426 denoted by #−5 and #12 that differ by 16 in parallax number. Each parallax component image 426 cropped from an image taken by a camera located outside the viewing zone is combined with a parallax component image 426 within the viewing zone. However, the combined portion (the vertical boundary line) is equivalent to the viewing zone edge at the time of stereoscopic display. For an image with a very small parallax, the parallax component images 426 exhibit relatively high continuousness at the combined portion. Accordingly, even after irreversibly compressed combined images are decompressed, the image quality at the combined portion is hardly degraded. Some of the combined images 2 (the six images denoted by #−3 through #3 among the sixteen images) each contain only one parallax component image 426. Since all the combined images 2 have the same number of vertical and horizontal pixels, the image data of the combined images 2 can be advantageously processed in the same manner as the processing of multiview data in a display device of a multiview type.

FIG. 11 is a table showing the specific numbers of horizontal pixels (the ranges of horizontal pixels (not sub-pixels)) in the parallax component images 426. The numbers shown in FIG. 11 also represent 3D pixel numbers (lens numbers). This table is created through calculations based on the average elemental image width (slightly larger than the total width of twelve pixels) determined by the predetermined viewing distance L. As is apparent from the table shown in FIG. 11, the image denoted by the parallax number #−13 (equivalent to the camera number #−13 in FIG. 12) identifying the parallax direction contains only the pixels between the second column and the 30th column among the 480 pixel columns in the camera image illustrated in FIG. 10. Accordingly, the size of the image denoted by #−13 is equivalent to the total width of twenty-nine pixels. The data of the 29-pixel width is divided at the intervals of twelve pixels, and the RGB pixels that are originally arranged in the transverse direction are diagonally arranged in a predetermined region in the parallax interleaved image.

Likewise, the image denoted by the parallax number #−11 contains only the pixels between the second column and the 123rd column among the 480 pixel columns in the camera image illustrated in FIG. 10. Accordingly, the size of the image denoted by #−11 is equivalent to the total width of 122 pixels. The data of the 122-pixel width is divided at the intervals of twelve pixels, and the RGB pixels are diagonally arranged in a predetermined region in the parallax interleaved image to be displayed on the display unit 331.

One of the combined images 2 shown in FIG. 8 is formed by combining the image denoted by the parallax number #−13 with the image denoted by the parallax number #4. The total width (the number of horizontal pixels) of the combination of the image denoted by the parallax number #−13 and the image denoted by the parallax number #4 is 29+451=480. Another one of the combined images 2 shown in FIG. 8 is formed by combining the image denoted by the parallax number #−11 with the image denoted by the parallax number #6. The total width of the combination of the image denoted by the parallax number #−13 and the image denoted by the parallax number #4 is 122+358=480. The total width of any other combination is also 480.

As described above, each parallax component image 426 is an image that is properly formed, in terms of design, through perspective projection with the predetermined viewing distance L or a similar viewing distance in the vertical direction, and orthographic projection in the horizontal direction. However, perspective projection may be performed both in the vertical direction and the horizontal direction, as long as the deformation in the stereoscopic image is inconspicuous.

FIG. 12 shows an example in which the sixteen combined images 2 shown in FIG. 8 are further combined linearly so as to form an ultimate combined image. This ultimate combined image is formed by connecting each two combined images 2 of adjacent parallaxes to each other in the horizontal direction. In this example, the two combined images 2 of the parallaxes (#−8 and #8) located at both further ends among the sixteen parallaxes close to the front face of the display plane are arranged at both ends of the ultimate combined image. This format is preferred in terms of high-speed conversion and versatility, because the ultimate combined image can be converted into a parallax interleaved image in the same manner as the processing of multiview data in a display device of a multiview type, and the conversion does not depend on the number of cameras when the predetermined viewing distance is varied.

Figure 13:
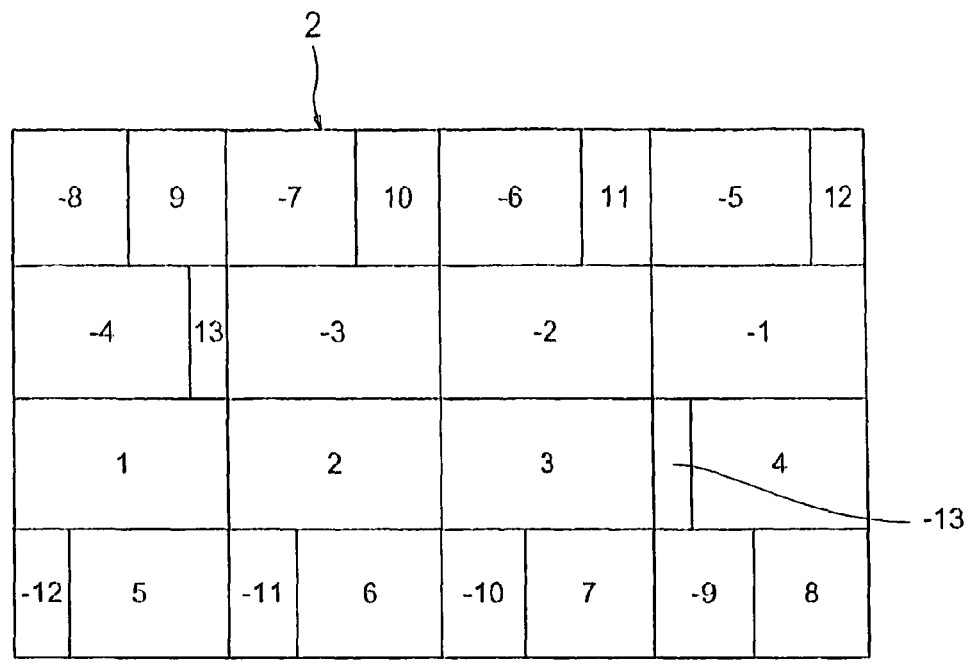
FIG. 13 is a schematic plan view of the format of an ultimate combined image formed by the stereoscopic image recording method according to another embodiment of the present invention.

As shown in FIG. 13, the sixteen combined images 2 having the same numbers of vertical and horizontal pixels as shown in FIG. 8 may be connected to one another both in the horizontal direction and the vertical direction, so as to present a tile-like format. This ultimate combined image in the tile-like format may have the same number of vertical and horizontal pixels as that in the parallax interleaved image to be display on the display face at the time of stereoscopic display. With the number of vertical and horizontal pixels in the ultimate combined image being equal to the number of vertical and horizontal pixels in the parallax interleaved image as the ultimate display image, compressed recording can be performed according to the standard such as MPEG2. More specifically, inter-frame compression or intra-frame compression can be applied, in a case where the ultimate combined image in the tile-like format shown in FIG. 13 is prepared as a frame, and a moving image that can be stereoscopically viewed is to be reproduced with many such frames.

The left and right ends of each parallax component image 426 are equivalent to either the ends of the screen or the ends of the viewing zone at the time of stereoscopic display. The connected portions between the parallax component images in the combined images are equivalent to the ends of the viewing zone, and the connected portions between the connected images are equivalent to the ends of the screen. In an irreversible compressing process, encoding is performed for each predetermined block size, but the connected portions between combined images often match the block boundaries.

Although the connected portions between the parallax component images in the combined images do not often match the block boundaries, degradation of the image quality does not matter, because a stereoscopic image naturally splits at the ends of the viewing zone (the boundaries with the adjacent lobes) and cannot be viewed properly.

Accordingly, even after the ultimate combined image is irreversibly compressed and is then decompressed, the stereoscopic image can be protected from adverse influence of the degradation of image quality at the connected portions.

This format is preferred in terms of high-speed conversion and versatility, because the ultimate combined image can be converted into a parallax interleaved image in the same manner as the processing of multiview data in a display device of a multiview type, and the conversion does not depend on the number of cameras when the predetermined viewing distance is varied.

The conversion from the ultimate combined image to the parallax interleaved image in FIG. 13 is the same as the conversion illustrated in FIG. 9. In a case where the optical apertures are not diagonally arranged but are arranged vertically, the conversion is performed through one-to-one mapping between images of the same number of vertical and horizontal pixels. In a case where the optical apertures are diagonally arranged, however, the pixel data of the parallax interleaved image needs to be generated through an interpolating process based on one or more adjacent pixels in the horizontal direction in the combined images, with the fact that the horizontal position of light ray varies among the pixel rows being taken into consideration. Where the x-coordinate and the y-coordinate of the pixels in the combined images prior to conversion are represented by $X_{in}$ and $Y_{in}$, and the x-coordinate and the y-coordinate of the pixels in the converted parallax interleaved image are represented by $X_{out}$ and $Y_{out}$, the pixel data can be determined by the following linear interpolating process:

$$k=(2b-3-Y_{in})\% b+1$$

$$P(X_{out})=(kP(X_{in})+(b-k)P(X_{in}+1))/b$$

Here, the coordinates $X_{in}$, $Y_{in}$, $X_{out}$, and $Y_{out}$ are integers, the symbol of operation "%" represents the operation for determining a remainder (an integer), the operation "(2b−3−

$Y_{in}$) % b" represents the remainder (an integer) obtained when ($2b-3-Y_{in}$) is divided by b. Meanwhile, P(X) represents the image data of the pixels of the coordinate X. As for the coefficient b, the square of b is equal to the number of parallaxes. Accordingly, b is four in the case of sixteen parallaxes, and b is five in the case of twenty-five parallaxes. The above described linear interpolating process is performed at a high speed. The generation of the pixel data of the parallax interleaved image can be performed through a process with a pixel shader.

If the above described conversion is performed via an intermediate format that collectively has sixteen rows formed with four sets of four rows extracted from the same locations in the respective stages of the four-stage structure shown in FIG. 13, mapping is contained within the sixteen rows. Therefore, the use of such an intermediate format might be preferred in some cases, depending on the processing system to be used. The converting process involving the format and the interpolating process shown in FIG. 13 is suitable for processing an actually shot image or an existing multi-viewpoint image. In such a case, each parallax component image is an image on which regular square sampling has been performed.

Figure 14:
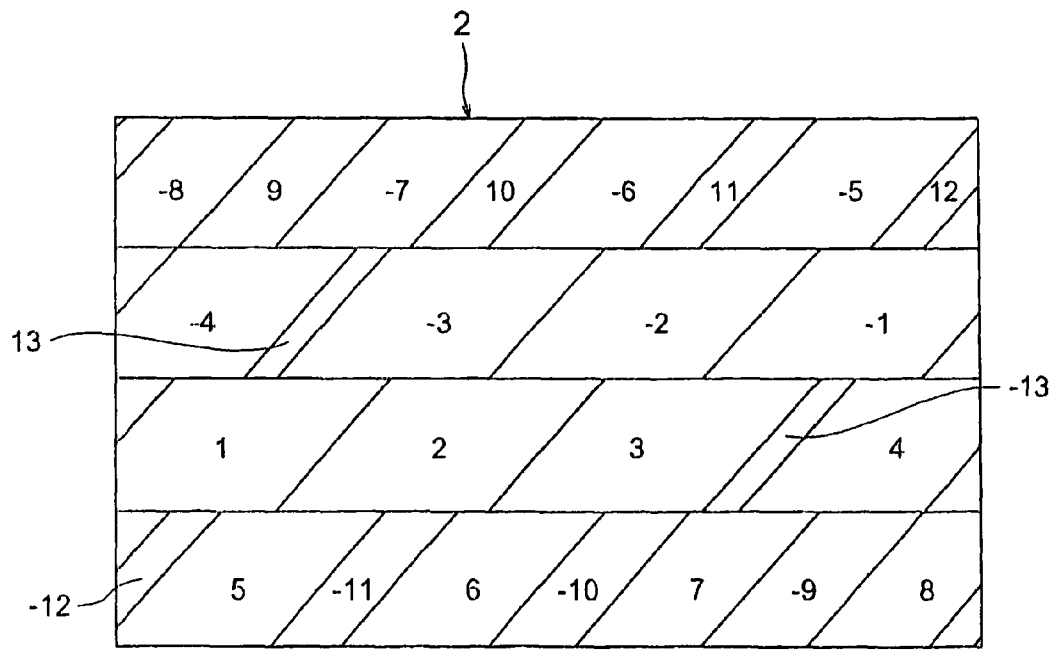
FIG. 14 is a schematic plan view of the format of an ultimate combined image formed by the stereoscopic image recording method according to still another embodiment of the present invention.

As shown in FIG. 14, the combined images in the ultimate combined image may be parallelograms, and the image data corresponding to one optical aperture may be aligned in a vertical line in the combined images. Accordingly, each combined image shows a diagonally deformed picture, but high continuousness can be maintained with respect to the diagonally extending optical apertures. In this arrangement, inter-frame compression and intra-frame compression can be applied, with little degradation of the image quality being caused at the time of irreversible compression recording. Like the conversion illustrated in FIG. 9, the conversion into a parallax interleaved image is performed through one-to-one mapping, with each one row in the combined images corresponding to four rows in the parallax interleaved image. Accordingly, the interpolating process performed in the example illustrated in FIG. 13 becomes unnecessary. However, the cyclicity of the converting process for each row in the parallax interleaved image is lost. As a result, the processing becomes a little more complicated. In case of CG (computer graphics) images, vertically dividing rendering can be performed, with the difference in horizontal position of light ray among the rows in a parallax interleaved image being taken into consideration. Therefore, the format shown in FIG. 14 and the one-to-one image transfer are suitable for CG. In such a case, each parallax component image is an image on which diagonal sampling has been performed according to the inclination of the optical apertures. In the case of an image on which square sampling has been originally performed, such as an actually shot image or an existing multi-viewpoint image, an interpolating process should be performed at the stage of forming the ultimate combined image of FIG. 14.

Figure 15:
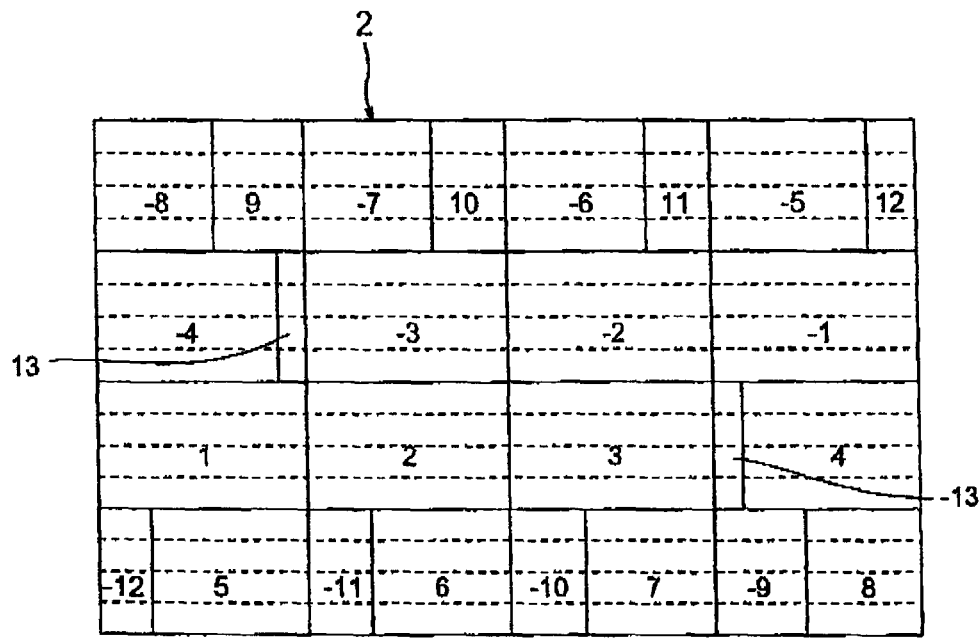
FIG. 15 is a schematic plan view of the format of an ultimate combined image formed by the stereoscopic image recording method according to further still another embodiment of the present invention.

As shown in FIG. 15, each combined image may have a structure formed by stacking m of parallax component images vertically in m stages. Each of the m of parallax component images has a vertical resolution that is 1/m of the horizontal resolution. The parallax component images divided by m are equivalent to the group of rows extracted in vertical cycles (sixteen rows in this example) of the optical apertures. Each of the images divided by m shows a picture that is 1/m of the original picture in the vertical direction. In this arrangement, inter-frame compression and intra-frame compression can be applied especially for a large-sized parallax interleaved image, with little degradation of the image quality being caused at the time of irreversible compression recording. Like the conversion illustrated in FIG. 9, the conversion into a parallax interleaved image is performed through one-to-one mapping, with each one row in the combined images corresponding to four rows in the parallax interleaved image. However, the cyclicity of the converting process for each row in the parallax interleaved image is lost. As a result, the processing becomes a little more complicated. In case of CG images, vertically dividing rendering can be performed, with the difference in horizontal position of light ray among the rows in a parallax interleaved image being taken into consideration. Therefore, the format shown in FIG. 15 and the one-to-one mapping are suitable for CG. In such a case, each parallax component image is an image on which diagonal sampling has been performed according to the inclination of the optical apertures. In the case of an image on which square sampling has been originally performed, such as an actually shot image or an existing multi-viewpoint image, an interpolating process should be performed at the stage of forming the ultimate combined image of FIG. 15.

The combined images shown in FIG. 8 do not necessarily form an ultimate combined image in which the combined images are arranged in a plane, but may be formed in a combined state as a rectangular-parallelepiped ray space defined by the "ray space method". In such a rectangular-parallelepiped virtual space, compression recording and interpolating can be performed.

Figure 16:
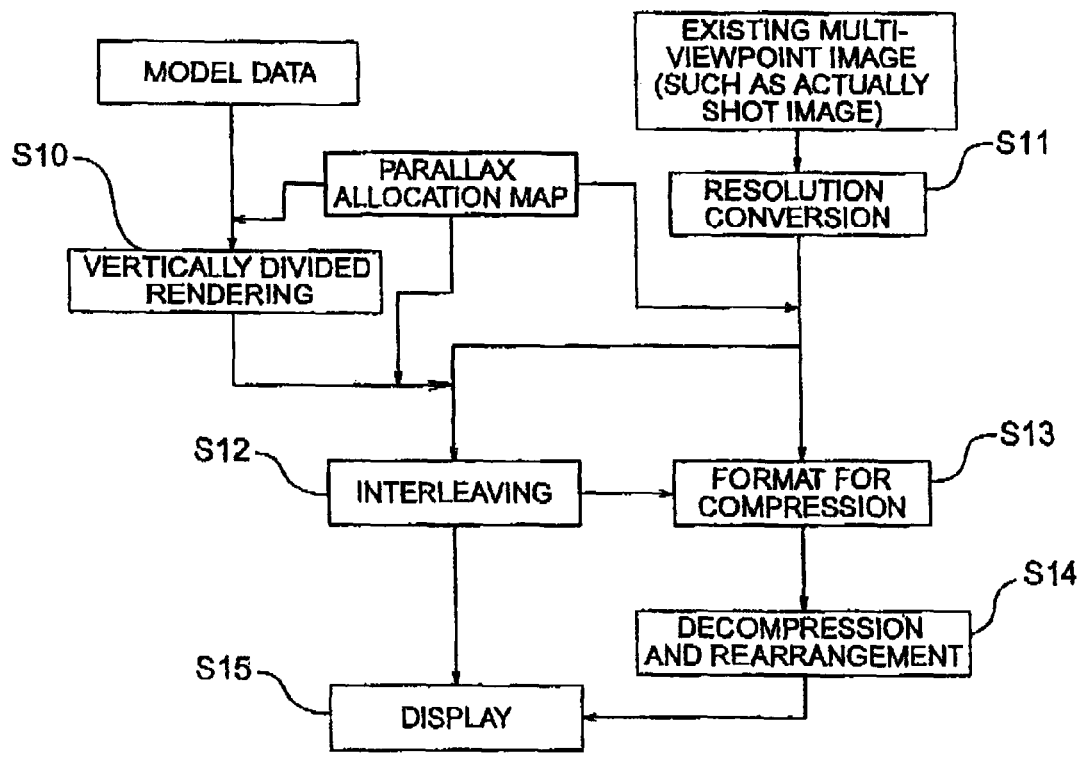
FIG. 16 schematically illustrates a method of recording combined images or an ultimate combined image formed by the stereoscopic image recording method through irreversible compression, and a method of reproducing the parallax interleaved image from the combined images or the ultimate combined image through reading, decompressing, and rearranging according to the embodiments described above.

Referring now to FIG. 16, a stereoscopic image data recording and a reproducing method are described. FIG. 16 schematically illustrates a method of recording the combined images 2 or an ultimate combined image formed by the stereoscopic image recording method through irreversible compression, and a method of reproducing the parallax interleaved image from the combined images or the ultimate combined image through reading, decompressing, and rearranging.

As described with reference to FIG. 17, the camera images indicated by the broken lines in FIG. 10 are first obtained by taking images of the object 421 to be displayed as a stereoscopic image in the respective camera positions (#13 to #1 and #−1 to #−13).

The parallax component images 421 with necessary numbers of vertical and horizontal pixels indicated by the solid lines in FIG. 10 are extracted from the camera images by cutting and resizing process (step S11). Each one or more parallax components images 421 with parallax numbers different from each other by the number of parallaxes are combined to form a combined image, as shown in FIG. 8, and the combined images are further combined and arranged so as to form an ultimate combined image (uncompressed) as shown in FIGS. 12 through 15 (step S12).

In a case where an image is to be generated from CG model data, vertically dividing rendering is performed according to the sets of parallel light rays emitted in a different horizontal position for each row (step S10). The resultant images are then combined and converted into an ultimate combined image (uncompressed) (step S12). For this converting process, a parallax allocation map that is prepared in advance may be used. With the cyclicity in the vertical direction being taken into consideration, the minimum unit number of rows (sixteen rows, for example) is sufficient for the parallax allocation map. The ultimate combined image is compressed by an irreversible encoding method with a high compression rate, such as JPEG. In a case where the stereoscopic image to be displayed is a moving image, the ultimate combined image is correlated with another ultimate combined image adjacent to the ultimate combined image in terms of time, and the ultimate combined images are compressed by an irreversible encoding method with a high compression rate, such as MPEG.

Figure 3:
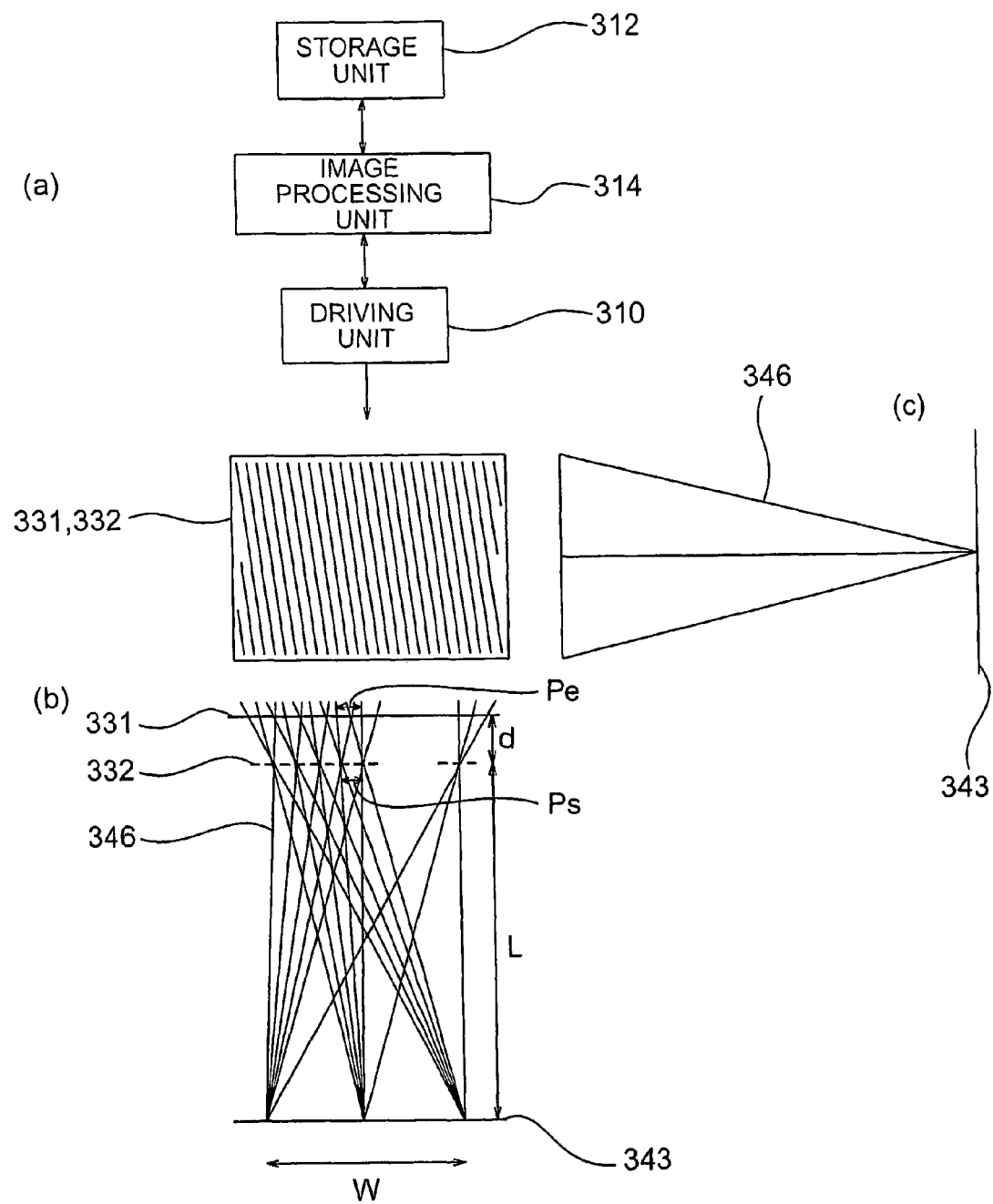
FIGS. 3(a), 3(b), and 3(c) schematically illustrate a stereoscopic display device for which the stereoscopic image recording method and the reproducing method according to one embodiment of present invention are applied.

The compressed ultimate combined image data are stored and saved on a storage medium or the storage unit 312 shown in FIG. 3(*a*) (Step S13).

At the time of reproduction, the compressed ultimate combined image is decompressed and converted into the ultimate combined image by the image processing unit 314 shown in FIG. 3(*a*) (step S14). The pixel row data corresponding to the optical apertures are extracted from the combined images of the ultimate combined image, and are rearranged in a frame memory (not shown) with a predetermined pitch, as shown in FIG. 9.

Figure 4:
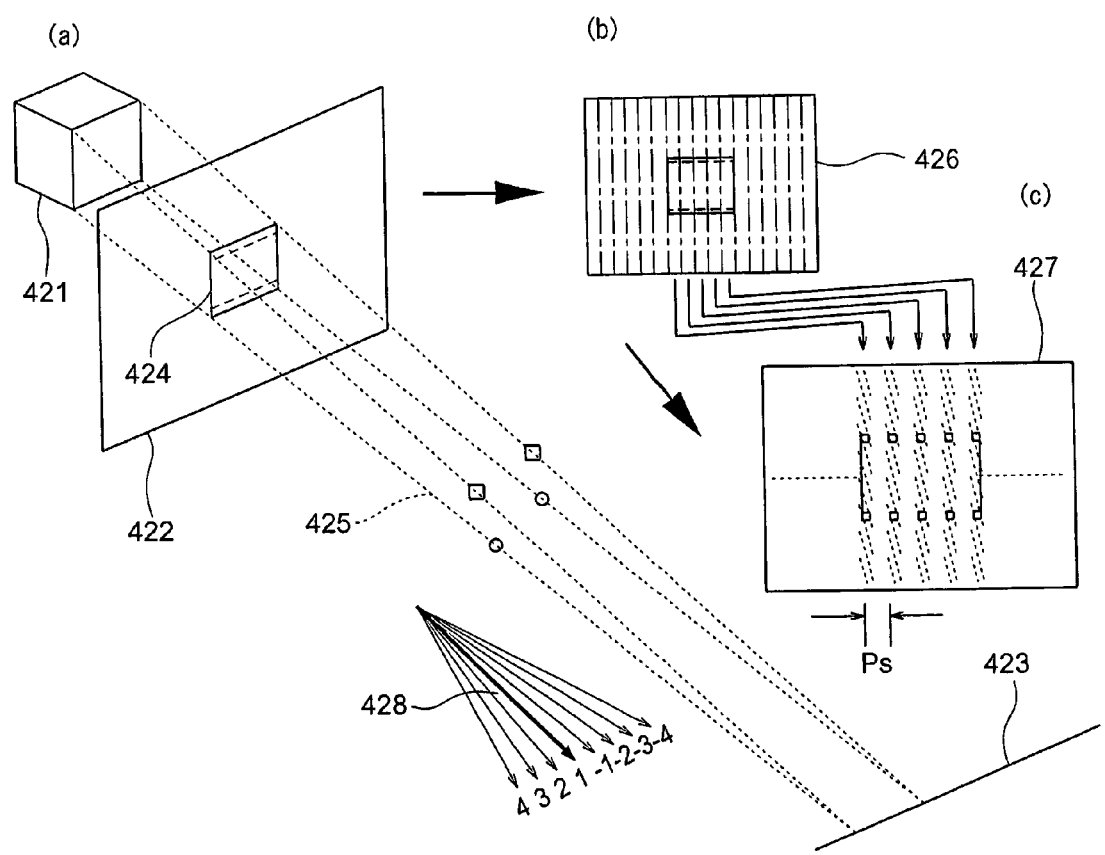
FIGS. 4(a), 4(b), and 4(c) illustrate a method of forming a parallax interleaved image based on parallax component images in a structure of a parallel-ray one-dimensional IP type according to one embodiment of the present invention.
Figure 5:
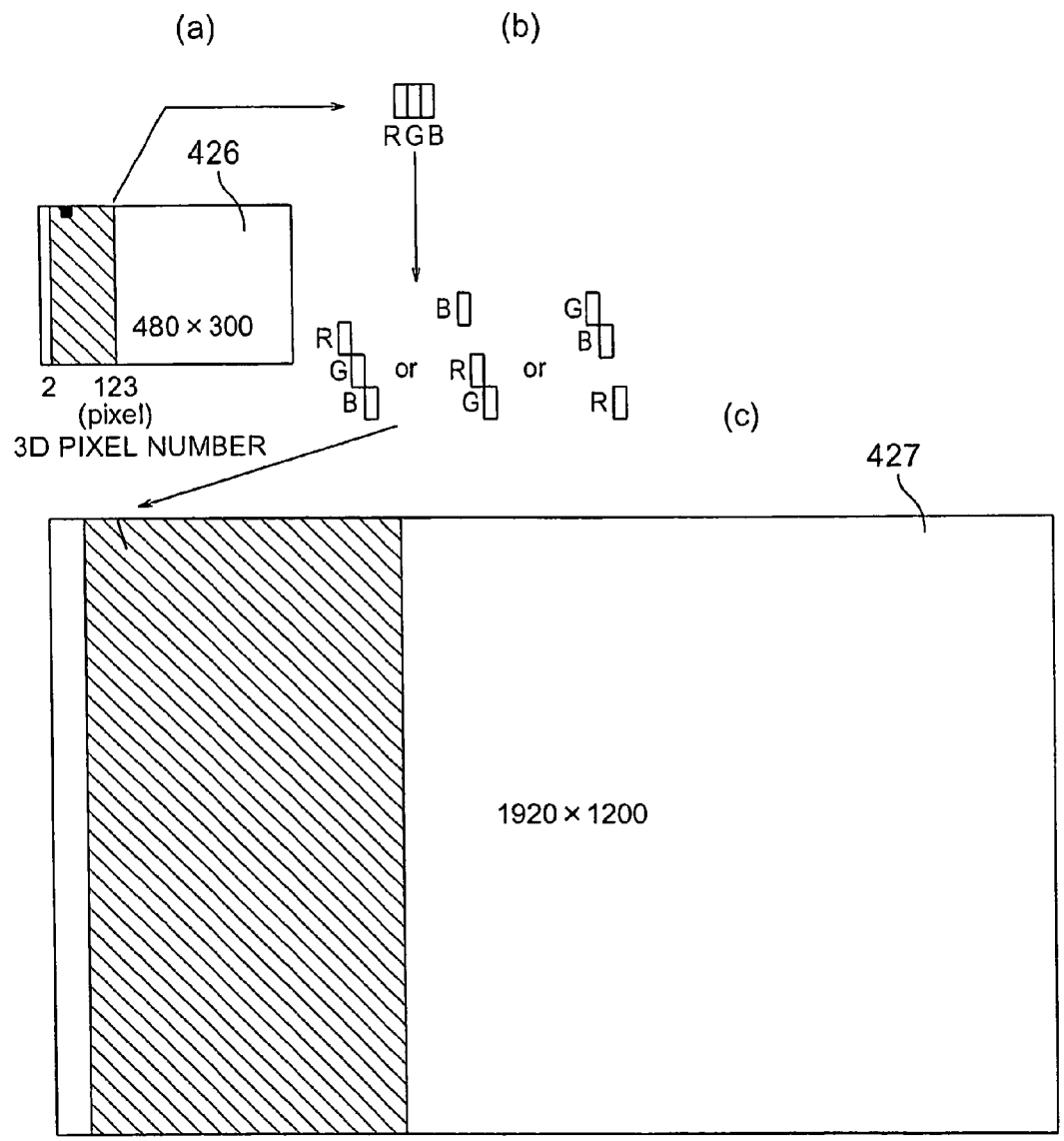
FIGS. 5(a), 5(b), and 5(c) schematically illustrate the allotment of the parallax component images to the parallax interleaved image according to one embodiment of the present invention.

After the ultimate combined image is rearranged in the frame memory, the entire parallax interleaved image is completed as shown in FIG. 4(*c*) (step S15).

The parallax interleaved image is displayed on the display unit 331, so as to display a stereoscopic image in the viewing zone. In the case of streaming via a remote server, the storage unit and the image processing unit are remote from each other.

The uncompressed ultimate combined image may be converted directly into a parallax interleaved image for display, without a compressing process. This is suitable for a real-time converting process.

In each of the ultimate combined images shown in FIGS. 12 through 15, the locations of all the combined images may be shifted cyclically, so that the ultimate combined image is converted into a parallax interleaved image. For example, the combined image #–2 is shifted to the location of the combined image #–1, and the combined image #–1 is shifted to the location of the combined image #1. In this manner, a stereoscopic image can be displayed in a shifted viewing zone (shifted by 1/16 of the viewing zone width). This process is suitable for fine adjustment of the viewing zone or head tracking.

As described above, after the conversion into the combined images 2 with the same numbers of vertical and horizontal pixels, the combined images 2 are compressed. In this manner, adverse influence due to an increase or a decrease in the number of cameras (parallax directions) or a change in pixel number is prevented when the predetermined viewing distance is varied. Furthermore, image quality degradation is minimized. More preferably, arrangement and combinations are employed so that the combined images 2 are correlated with one another. Thus, a higher compression rate can be achieved.

The program for executing the stereoscopic image data recording method and the reproducing method described with reference to FIG. 16 is executed by a computer system illustrated in FIGS. 18 and 19.

Figure 18:
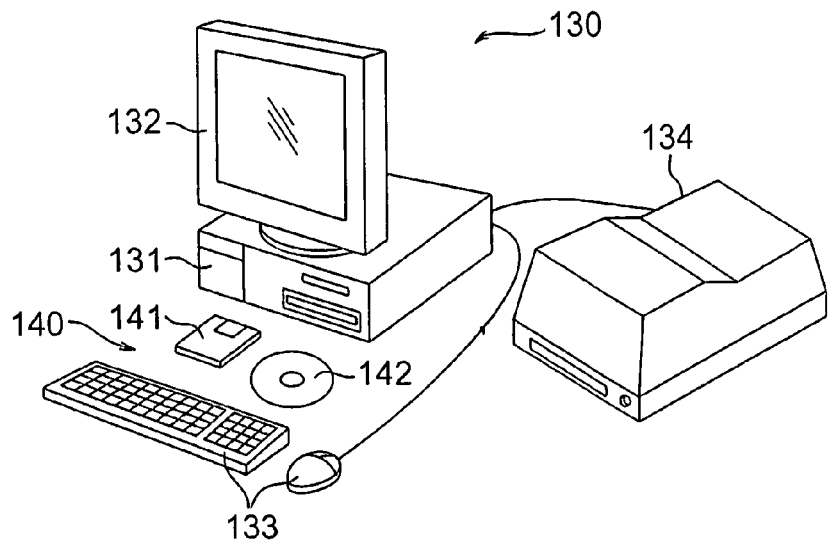
FIG. 18 is a perspective view of an example of a computer system that executes a stereoscopic image data recording or reproducing program according to one embodiment of the present invention.

As shown in FIG. 18, a computer system 130 includes a computer main body 131 having a CPU and a GPU, a display device 132 such as a LCD, an input unit 133 such as a keyboard and a mouse, and a printer 134 that performs printing.

Figure 19:
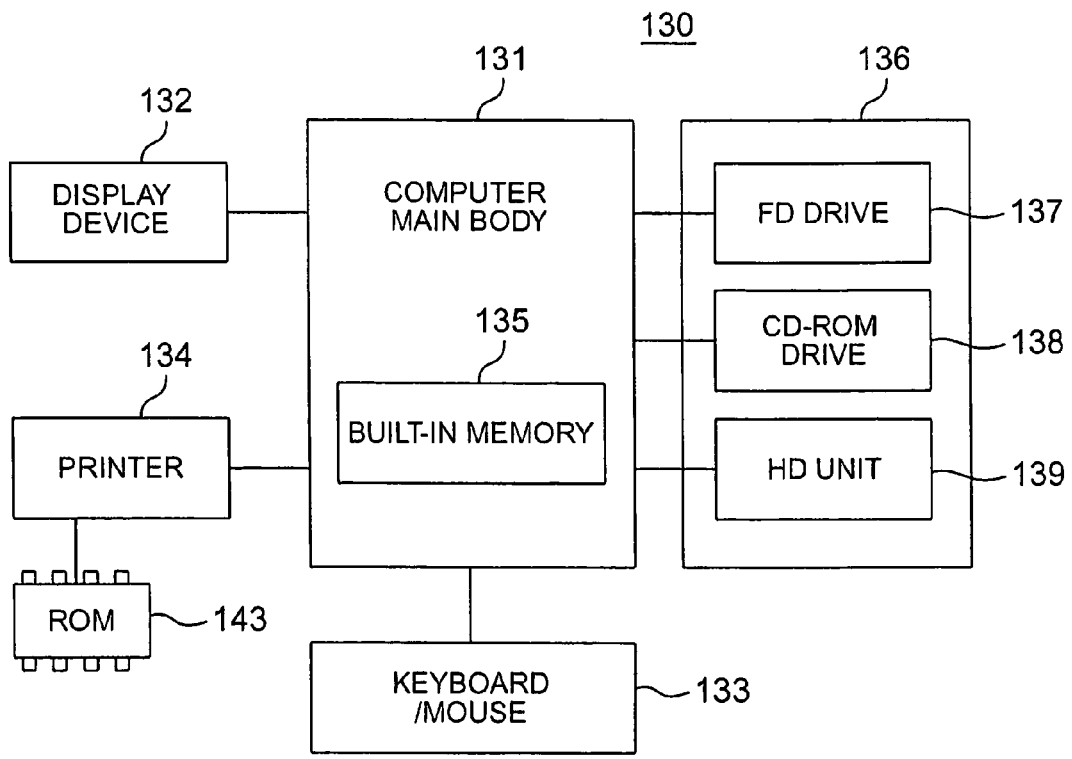
FIG. 19 is a block diagram of a computer system that executes a stereoscopic image data recording or reproducing program according to one embodiment of the present invention.

As shown in FIG. 19, the computer main body 131 has a built-in memory 135 formed with a RAM, and a recording (storage) disk drive unit 136 that can be provided inside or outside the computer main body 131. As the recording disk drive unit 136, a floppy disk (FD) drive 137, an optical disk drive 138, and a hard disk (HD) drive 139 are provided. As shown in FIG. 18, a floppy disk (FD) 141 to be inserted to the slot of the FD drive 137, and a CD-ROM, a CD-R, a DVD-RAM, or a DVD-R 142 to be used in the optical disk drive 138 are used as recording media 140 to be used in the recording disk drive unit 136. The recording media 140 may be any other computer-readable media, such as other optical recording disks, card memories, and magnetic tapes.

The above described program may be installed in a remote computer that is connected to a network such as the Internet. In such a case, compressed images are downloaded via the network, and are decompressed and rearranged by a local computer.

The above described program may also be provided or distributed via a network such as the Internet.

As described so far, according to the present invention, recording and reproduction with a high compression rate can be efficiently performed, with little degradation in image quality in a structure of a parallel-ray one-dimensional IP type using lenses extending diagonally with respect to the vertical direction. Like general MPEG data, the stereoscopic image data structure and the recording method according to the present invention can be employed not only for recording on a recording medium, but also for distribution via a wire or wireless communication means, such as streaming.

The present invention is not limited to the above described embodiments, but various modifications can be made to them in practice without departing from the scope of the invention.

Also, the components disclosed in the above embodiments may be combined with one another in various ways so as to form various other structures. Some of the components may be removed from the components disclosed in the above embodiments. Furthermore, the components may be combined with components of some other embodiments, if necessary.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

The invention claimed is:

1. A stereoscopic image data structure for a stereoscopic display device that displays a stereoscopic image, with parallaxes being given in a horizontal direction but not given in a vertical direction, the stereoscopic display device comprising:

a display unit having a display face on which a parallax interleaved image for stereoscopic display is displayed, with pixels being arranged with a first horizontal pitch in the horizontal direction; and a light control unit disposed to face the display face, the light control unit having optical apertures arranged with a second horizontal pitch in the horizontal direction, the optical apertures inclined from the vertical direction, the second horizontal pitch being equal to n times (n being an integer number) the first horizontal pitch, the light control unit controlling directions of light rays emitted from the display unit, the stereoscopic image data structure comprising: a parallax component image data representing n or more parallax component images, each having accumulated pixels that cause the pixels to generate parallel light rays in a respective parallax direction in a viewing zone, and each having a different number of horizontal pixels, wherein the parallax interleaved image is formed by combining n combined images, each combined image having a same number of vertical pixels as the number of horizontal pixels, wherein each combined image is formed by combining one or more parallax component images with parallax directions different from each other by n.

2. A method of recording stereoscopic image data for a stereoscopic display device that displays a stereoscopic image, with parallaxes being given in a horizontal direction but not given in a vertical direction, the stereoscopic display device including:
a display unit having a display face on which a parallax interleaved image for stereoscopic display is displayed, with pixels being arranged with a first horizontal pitch in the horizontal direction; and
a light control unit disposed to face the display face, the light control unit having optical apertures arranged with a second horizontal pitch in the horizontal direction, the optical apertures inclined from the vertical direction, the second horizontal pitch being equal to n times (n being an integer number) the first horizontal pitch, the light control unit controlling directions of light rays emitted from the display unit, the method comprising:
preparing a parallax component image data representing n or more parallax component images, each having accumulated pixels that cause the pixels to generate parallel light rays in a respective parallax direction in a viewing zone, and each having a different number of horizontal pixels; and
recording n combined images, each combined image having a same number of vertical pixels as the number of horizontal pixels, and each square image being formed by combining one or more parallax component images with parallax directions different from each other by n.

3. The method of recording stereoscopic image data as claimed in claim 2, wherein:
each of the combined images is a parallelogram; and
the image data corresponding to one of the optical apertures is aligned in a vertical line in the combined images.

4. The method of recording stereoscopic image data as claimed in claim 2, wherein
each of the combined images has parallax component images stacked in m stages, each of the parallax component images having a vertical resolution that is 1/m of a horizontal resolution.

5. The method of recording stereoscopic image data as claimed in claim 2, wherein each of the parallax component images are formed by perspective projection in vertical direction according to the predetermined viewing distance and by orthographic projection in horizontal direction.

6. The method of recording stereoscopic image data as claimed in claim 2, wherein each of the parallax component images are formed by perspective projection according to the predetermined viewing distance.

7. The method of recording stereoscopic image data as claimed in claim 2, wherein the n combined images are further combined so as to form an ultimate combined image to be recorded.

8. The method of recording stereoscopic image data as claimed in claim 7, wherein the ultimate combined image is formed by combining the combined images in such a manner that the combined images having adjacent parallax directions are adjacent to one another in the horizontal direction.

9. The method of recording stereoscopic image data as claimed in claim 8, wherein:
the ultimate combined image is formed by combining the combined images in such a manner that the combined images having adjacent parallax directions are adjacent to one another in the horizontal direction; and
two combined images having the parallax directions at both ends of the n parallax direction close to the front face of the display face are disposed at both ends of the ultimate combined image.

10. The method of recording stereoscopic image data as claimed in claim 7, wherein the ultimate combined image is formed by combining the combined images in the horizontal direction and the vertical direction, so as to form a tile-like format.

11. The method of recording stereoscopic image data as claimed in claim 7, wherein the ultimate combined image has the same numbers of vertical and horizontal pixels as those of the parallax interleaved image displayed on the display face at the time of stereoscopic display.

12. The method of recording stereoscopic image data as claimed in claim 7, wherein the ultimate combined image is formed as a rectangular-parallelepiped ray space defined by a ray space method.

13. The method of recording stereoscopic image data as claimed in claim 7, wherein the combined images or the ultimate combined image is irreversibly compressed and then recorded.

14. A reproducing method for a stereoscopic image, with parallaxes being given in a horizontal direction but not given in a vertical direction, the stereoscopic display device including:
a display unit having a display face on which a parallax interleaved image for stereoscopic display is displayed, with pixels being arranged with a first horizontal pitch in the horizontal direction; and
a light control unit disposed to face the display face, the light control unit having optical apertures arranged with a second horizontal pitch in the horizontal direction, the optical apertures inclined from the vertical direction, the second horizontal pitch being equal to n times (n being an integer number) the first horizontal pitch, the light control unit controlling directions of light rays emitted from the display unit, the method comprising:
preparing a parallax component image data representing n or more parallax component images, each having accumulated pixels that cause the pixels to generate parallel light rays in a respective parallax direction in a viewing zone, and each having a different number of horizontal pixels;
recording n combined images, each combined image having a same number of vertical pixels as the number of horizontal pixels, and each square image being formed by combining one or more parallax component images with parallax directions different from each other by n; and
displaying a parallax interleaved image on the display face after converting the n combined images into the parallax interleaved image.

15. The reproducing method for a stereoscopic image as claimed in claim 14, wherein:
each of the combined images is a rectangular having the same aspect ratio as the parallax interleaved image; and
the conversion into the parallax interleaved image involves generation of pixel data of the parallax interleaved image through an interpolating process based on one or more pixels adjacent to each other in the horizontal direction in the combined images.

16. A reproducing method of a stereoscopic image, with parallaxes being given in a horizontal direction but not given in a vertical direction, the stereoscopic display device including:
  a display unit having a display face on which a parallax interleaved image for stereoscopic display is displayed, with pixels being arranged with a first horizontal pitch in the horizontal direction; and
  a light control unit disposed to face the display face, the light control unit having optical apertures arranged with a second horizontal pitch in the horizontal direction, the optical apertures inclined from the vertical direction, the second horizontal pitch being equal to n times (n being an integer number) the first horizontal pitch, the light control unit controlling directions of light rays emitted from the display unit,
the method comprising:
  preparing a parallax component image data representing n or more parallax component images, each having accumulated pixels that cause the pixels to generate parallel light rays in a respective parallax direction in a viewing zone, and each having a different number of horizontal pixels;
  recording an ultimate combined image that is formed by combining n combined images, each combined image having a same number of vertical and horizontal pixels, the n combined images being formed by combining one or more parallax component images with parallax directions different from each other by n; and
  displaying a parallax interleaved image on the display face after converting the ultimate combined image into the parallax interleaved image.

17. The reproducing method for a stereoscopic image as claimed in claim 16, wherein:
  each of the combined images is a rectangular having the same aspect ratio as the parallax interleaved image; and
  the conversion into the parallax interleaved image involves generation of pixel data of the parallax interleaved image through an interpolating process based on one or more pixels adjacent to each other in the horizontal direction in the combined images.

18. A non-transitory computer-readable medium including a computer-executable program for recording stereoscopic image data for a stereoscopic display device that displays a stereoscopic image, with parallaxes being given in a horizontal direction but not given in a vertical direction,
  the stereoscopic display device including:
    a display unit having a display face on which a parallax interleaved image for stereoscopic display is displayed, with pixels being arranged with a first horizontal pitch in the horizontal direction; and
    a light control unit disposed to face the display face, the light control unit having optical apertures arranged with a second horizontal pitch in the horizontal direction, the optical apertures inclined from the vertical direction, the second horizontal pitch being equal to n times (n being an integer number) the first horizontal pitch, the light control unit controlling directions of light rays emitted from the display unit,
  the program comprising instructions for:
    preparing a parallax component image data representing n or more parallax component images, each having accumulated pixels that cause the pixels to generate parallel light rays in a respective parallax direction in a viewing zone, and each having a different number of horizontal pixels; and
    recording n combined images, each combined image having a same number of vertical and horizontal pixels, and each square image being formed by combining one or more parallax component images with parallax directions different from each other by n.

19. A non-transitory computer-readable medium including a computer-executable reproducing program for displaying a stereoscopic image on a stereoscopic display device, with parallaxes being given in a horizontal direction but not given in a vertical direction,
  the stereoscopic display device including:
    a display unit having a display face on which a parallax interleaved image for stereoscopic display is displayed, with pixels being arranged with a first horizontal pitch in the horizontal direction; and
    a light control unit disposed to face the display face, the light control unit having optical apertures arranged with a second horizontal pitch in the horizontal direction, the optical apertures inclined from the vertical direction, the second horizontal pitch being equal to n times (n being an integer number) the first horizontal pitch, the light control unit controlling directions of light rays emitted from the display unit,
  the program comprising instructions for:
  preparing a parallax component image data representing n or more parallax component images, each having accumulated pixels that cause the pixels to generate parallel light rays in a respective parallax direction in a viewing zone, and each having a different number of horizontal pixels;
  recording n combined images, each combined image having a same number of vertical and horizontal pixels, and each square image being formed by combining one or more parallax component images with parallax directions different from each other by n; and
  displaying a parallax interleaved image on the display unit after converting the n combined images into the parallax interleaved image.

20. A non-transitory computer-readable medium including a computer-executable reproducing program for displaying a stereoscopic image on a stereoscopic display device, with parallaxes being given in a horizontal direction but not given in a vertical direction,
  the stereoscopic display device including:
    a display unit having a display face on which a parallax interleaved image for stereoscopic display is displayed, with pixels being arranged with a first horizontal pitch in the horizontal direction; and
    a light control unit disposed to face the display face, the light control unit having optical apertures arranged with a second horizontal pitch in the horizontal direction, the optical apertures inclined from the vertical direction, the second horizontal pitch being equal to n times (n being an integer number) the first horizontal pitch, the light control unit controlling directions of light rays emitted from the display unit,
  the program comprising instructions for:
    preparing a parallax component image data representing n or more parallax component images, each having accumulated pixels that cause the pixels to generate parallel light rays in a respective parallax direction in a viewing zone, and each having a different number of horizontal pixels;
    recording an ultimate combined image that is formed by combining n combined images, each combined image having a same number of vertical and horizontal pixels, the n combined images being formed by combining one or more parallax component images with parallax directions different from each other by n; and displaying a parallax interleaved image on the display unit after converting the ultimate combined image into the parallax interleaved image.

\* \* \* \* \*